United States Patent
Kaechi

(10) Patent No.: US 11,018,514 B2
(45) Date of Patent: May 25, 2021

(54) ELECTRONIC DEVICE AND CONTROL METHOD

(71) Applicant: CANON KABUSHIKI KAISHA, Tokyo (JP)

(72) Inventor: Shuya Kaechi, Hashimoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 77 days.

(21) Appl. No.: 16/256,961

(22) Filed: Jan. 24, 2019

(65) Prior Publication Data

US 2019/0237983 A1 Aug. 1, 2019

(30) Foreign Application Priority Data

Jan. 31, 2018 (JP) .............................. JP2018-015240

(51) Int. Cl.
*H02J 7/00* (2006.01)
*H02J 7/04* (2006.01)
*H01M 10/44* (2006.01)

(52) U.S. Cl.
CPC ........... *H02J 7/0029* (2013.01); *H01M 10/44* (2013.01); *H02J 7/04* (2013.01); *H02J 7/00* (2013.01); *H02J 2207/40* (2020.01)

(58) Field of Classification Search
CPC ........ H02J 7/04; H02J 7/0029; H02J 2207/40; H02J 7/00; H01M 10/44

USPC .................... 320/134, 138, 148, 162; 702/63
See application file for complete search history.

(56) References Cited

U.S. PATENT DOCUMENTS

| 8,638,072 | B2 | 1/2014 | Vilhauer et al. |
| 2010/0219797 | A1* | 9/2010 | Veselic ................. H02J 7/0068 320/162 |
| 2012/0249084 | A1* | 10/2012 | Vilhauer ............... H02J 7/0029 320/162 |
| 2018/0059750 | A1* | 3/2018 | Kaechi ..................... H02J 7/342 |
| 2018/0062218 | A1* | 3/2018 | Kaechi .................... H02J 7/008 |
| 2018/0241096 | A1* | 8/2018 | Kaechi ...................... G08B 5/36 |

FOREIGN PATENT DOCUMENTS

| JP | 2014509829 A | 4/2014 |
| WO | 2012/134577 A1 | 10/2012 |

* cited by examiner

*Primary Examiner* — Edward Tso
*Assistant Examiner* — Aaron Piggush
(74) *Attorney, Agent, or Firm* — Canon U.S.A., Inc. I.P. Division

(57) ABSTRACT

An electronic device comprises a connector that receives power supplied from a power supply apparatus, a charging unit that charges a battery using power received from the power supply apparatus, and a testing unit that tests a power supply capability of the power supply apparatus by passing current supplied from the power supply apparatus to a load unit in a state where receiving power from the power supply apparatus is limited by the charging unit.

9 Claims, 19 Drawing Sheets

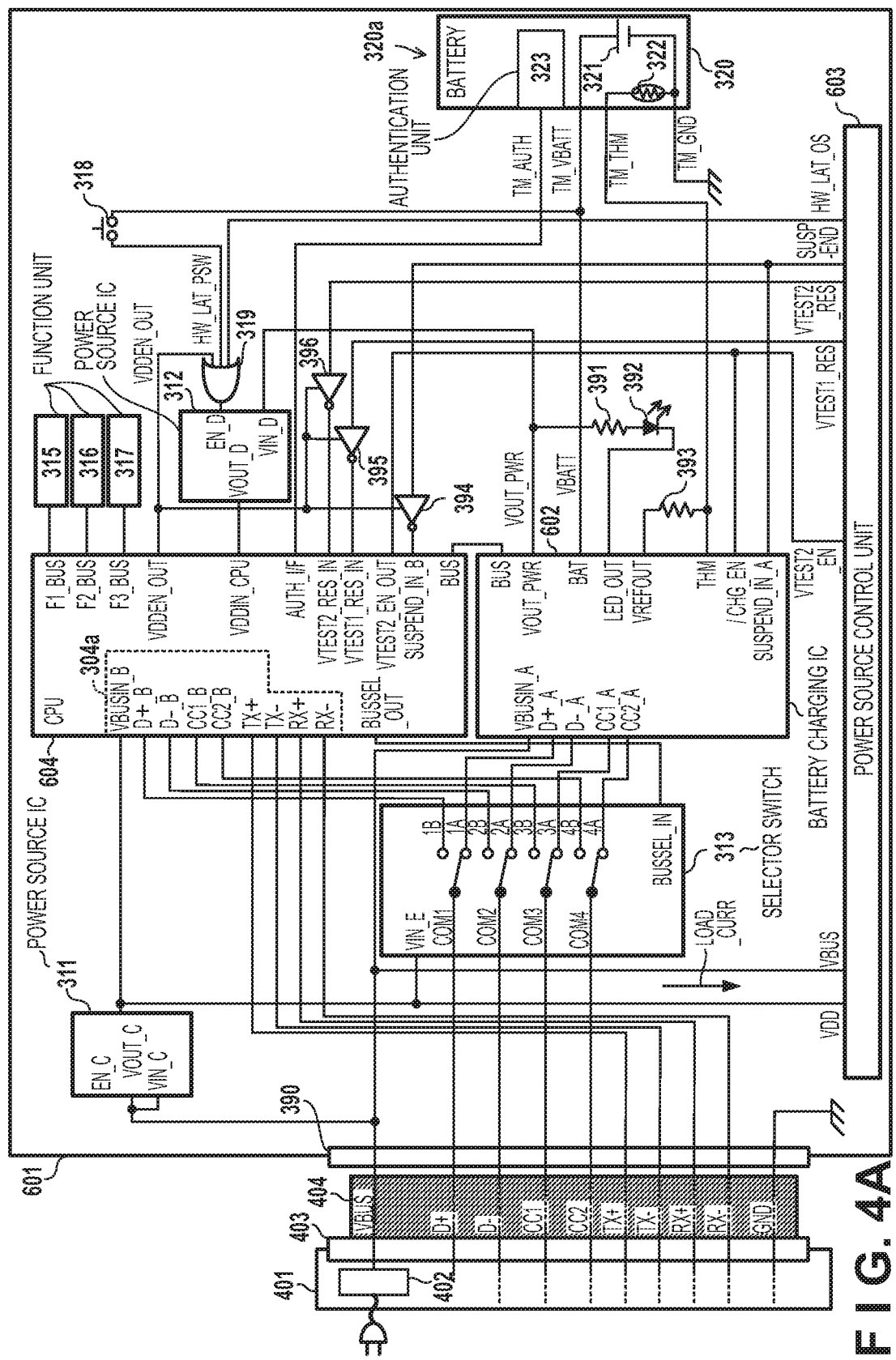
F I G. 4A

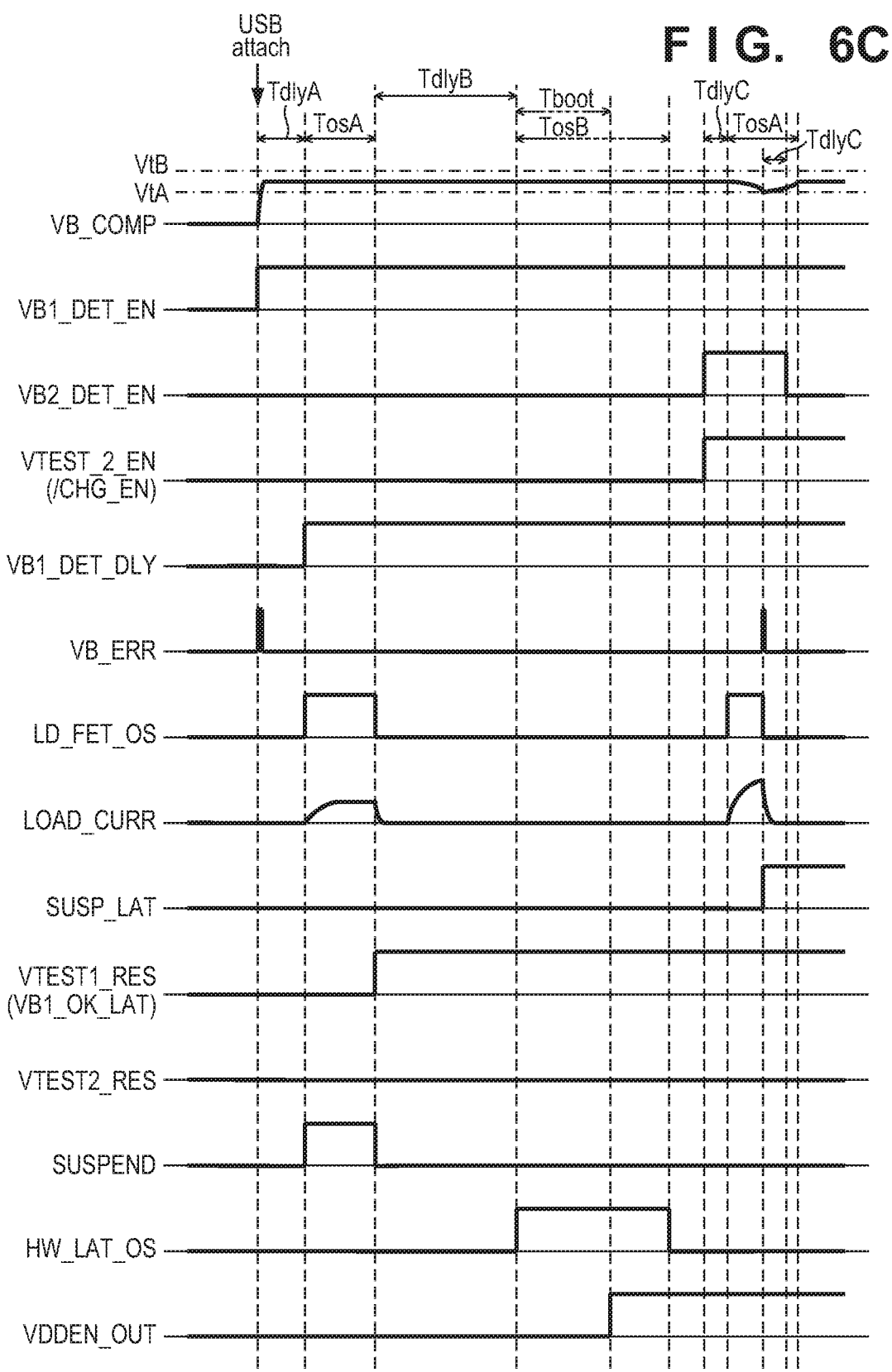

ELECTRONIC DEVICE AND CONTROL METHOD

BACKGROUND

Field of the Invention

Aspects of the disclosure generally relate to an electronic device capable of receiving power supplied from a power supply apparatus, and to a method of controlling the electronic device.

Description of the Related Art

Some electronic devices that have Universal Serial Bus (USB) connectors, which are connectors based on a USB standard, can charge batteries with power obtained from a power supply apparatus through the USB connector. Such an electronic device can detect the power supply capability of the power supply apparatus through the USB connector.

Japanese Patent Laid-Open No. 2014-509829 discloses an apparatus that includes a first circuit, which draws current from a charging source at multiple current levels, and a second circuit, which determines a charging current capacitance of the charging source using the first circuit.

However, with an electronic device having a USB connector, the power supply capability of the power supply apparatus as detected by the electronic device through the USB connector may be different from the actual power supply capability of the power supply apparatus. For example, it is conceivable that the power supply capability of the power supply apparatus will change for some reason after the electronic device has detected the power supply capability of the power supply apparatus through the USB connector. Additionally, it is conceivable that the electronic device will erroneously detect the power supply capability of the power supply apparatus through the USB connector. Further still, it is conceivable that the power supply apparatus will misrepresent its own power supply capability.

SUMMARY

According to an aspect of the embodiments, one or more problems arising when detecting the actual power supply capability of a power supply apparatus can be solved.

According to an aspect of the embodiments, there is provided an electronic device comprising: a connector that receives power supplied from a power supply apparatus; a charging unit that charges a battery using power received from the power supply apparatus; and a testing unit that tests a power supply capability of the power supply apparatus by passing current supplied from the power supply apparatus to a load unit in a state where receiving power from the power supply apparatus is limited by the charging unit.

According to an aspect of the embodiments, there is provided a method comprising: limiting power received from a power supply apparatus by a charging unit, wherein the charging unit charges a battery using the power received from the power supply apparatus; and examining a power supply capability of the power supply apparatus by passing current supplied from the power supply apparatus to a load unit in a state where receiving power from the power supply apparatus is limited by the charging unit.

According to an aspect of the embodiments, there is provided a non-transitory storage medium that stores a program causing a computer to execute a method, the method comprising: limiting power received from a power supply apparatus by a charging unit, wherein the charging unit charges a battery using the power received from the power supply apparatus; and examining a power supply capability of the power supply apparatus by passing current supplied from the power supply apparatus to a load unit in a state where receiving power from the power supply apparatus is limited by the charging unit.

Further aspects of the embodiments will become apparent from the following embodiments.

BRIEF DESCRIPTION OF THE DRAWINGS

FIGS. 4A and 4B are block diagrams illustrating one example of components of an electronic device 601 according to a second embodiment.

FIG. 6C is a timing chart illustrating an example of operations of the electronic device 601 according to the second embodiment.

DESCRIPTION OF THE EMBODIMENTS

Exemplary embodiments, features, and aspects of the disclosure will be described below with reference to the drawings. However, aspects of the disclosure are not limited to the following embodiments.

First Embodiment

Figure 1A:
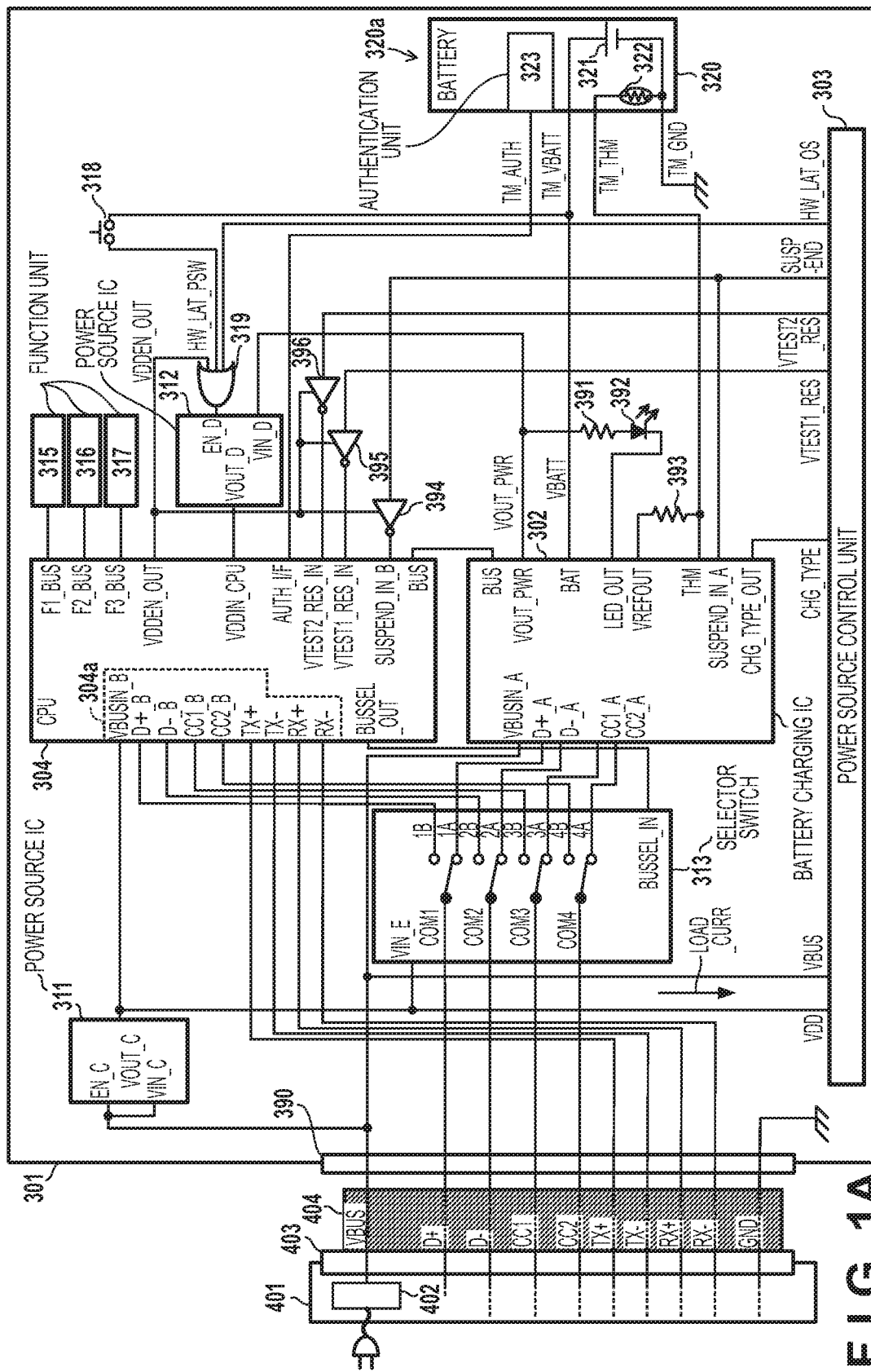
FIGS. 1A and 1B are block diagrams illustrating one example of components of an electronic device 301 according to a first embodiment.
Figure 1B:
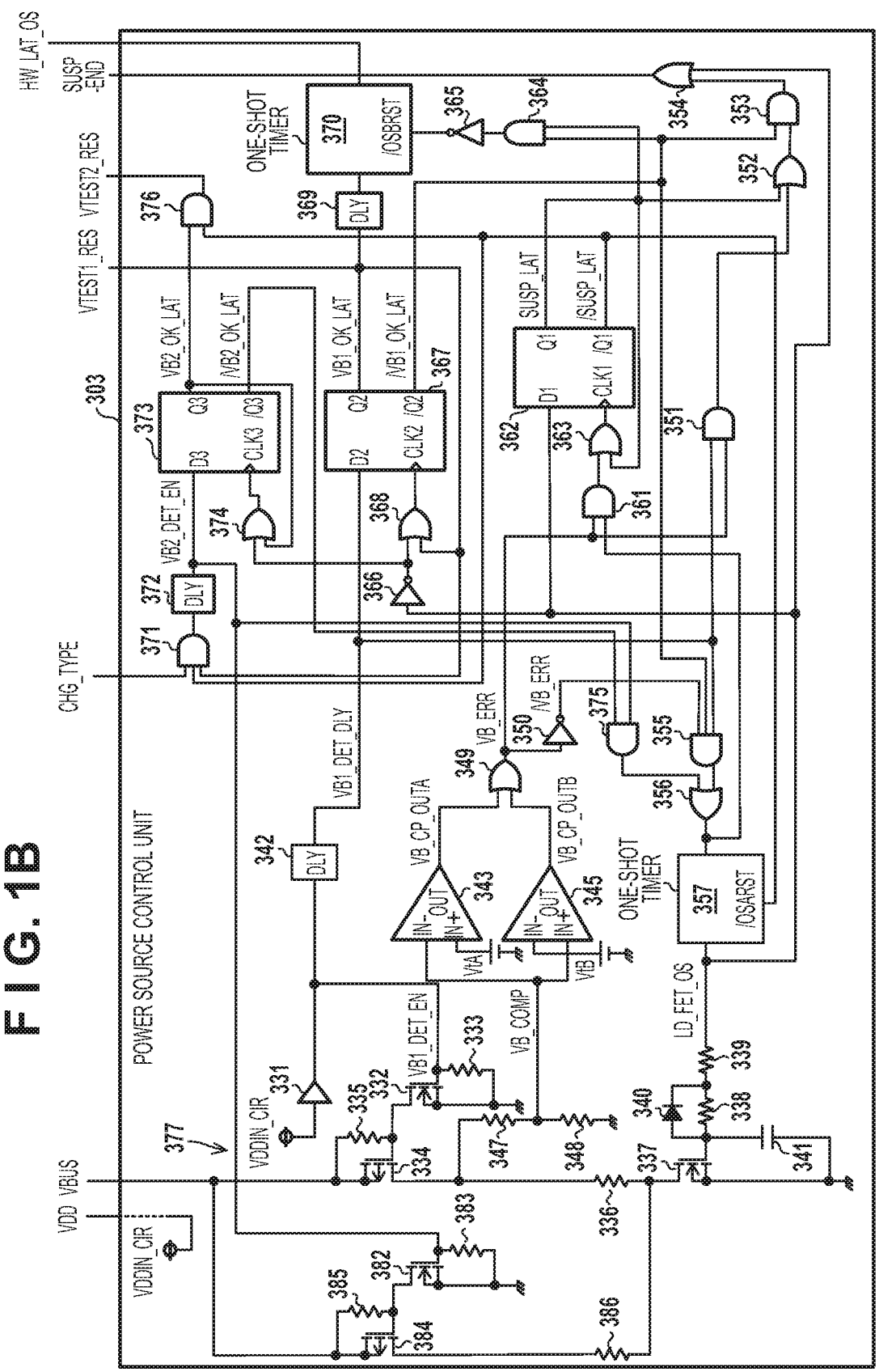

An electronic device according to a first embodiment will be described with reference to FIGS. 1A to 3C. FIGS. 1A and 1B are block diagrams illustrating one example of components of an electronic device 301 according to the first embodiment.

As illustrated in FIG. 1A, the electronic device 301 according to the first embodiment includes a battery charging IC 302, a power source control unit 303, a central processing unit (CPU) 304, power source ICs 311 and 312, and a selector switch 313. The electronic device 301 further includes function units 315, 316, and 317, a switch 318, an OR gate 319, and a USB connector 390. Furthermore, the electronic device 301 includes a resistor 391, a light-emitting diode (LED) 392, a pull-up resistor 393, and inverters 394 to 396. In the electronic device 301, a battery 320 functions as a power source of the electronic device 301.

The USB connector 390 is, for example, a connector (receptacle) compliant with USB Type-C. A power supply apparatus 401 includes a USB connector 403. The USB connector 403 is, for example, a connector (receptacle) compliant with USB Type-C. The USB connector 390 of the electronic device 301 and the USB connector 403 of the power supply apparatus 401 can be connected by a USB interface cable 404. Although an example in which the USB connectors 390 and 403 are USB Type-C connectors is described here, the connectors are not limited thereto. The USB connector 390 can function as part of a power receiving unit that receives power from the power supply apparatus 401. The USB connector 403 can function as part of a power supply unit that supplies power to the electronic device.

The USB connectors 390 and 403 include VBUS terminals for supplying power from the power supply apparatus 401 to the electronic device 301 over the USB interface cable 404. The USB connectors 390 and 403 further include D+ terminals and D− terminals for sending and receiving data using differential signals. The USB connectors 390 and 403 further include CC1 terminals and CC2 terminals, which are configuration channel (CC) terminals. The electronic device 301 can detect the power supply capability of the power supply apparatus 401 using the D+ terminals and the D− terminals, or the CC terminals. The USB connectors 390 and 403 further include TX+ terminals and TX− terminals, which are terminals for transmitting signals. The USB connectors 390 and 403 further include RX+ terminals and RX− terminals, which are terminals for receiving signals. The USB connectors 390 and 403 also include ground (GND) terminals.

The power supply apparatus 401 includes a VBUS power source 402. The power supply apparatus 401 may be an apparatus having only a power supply function, or may be an apparatus having other functions in addition to the power supply function. Note that in the first and other embodiments, "USB standard" includes at least one of USB 2.0, USB 3.0, USB 3.1, USB BC (Battery Charging) 1.2, USB PD (Power Delivery), and USB Type-C. Power supplied from outside of the power supply apparatus 401, or power supplied from a battery (not shown) connected to the power supply apparatus 401, may be used as the power supplied to the electronic device 301 from the VBUS power source 402.

The CPU 304 controls the electronic device 301 as a whole. The CPU 304 includes random access memory (RAM) and read-only memory (ROM). The RAM is used as a work area or the like. The ROM stores programs describing process sequences, or the like.

The CPU 304 includes a VDDIN_CPU terminal. The main functions of the CPU 304 run when a predetermined voltage is supplied to the VDDIN_CPU terminal. The CPU 304 has a USB function. The USB function of the CPU 304 is realized by a USB function unit 304a of the CPU 304. The USB function unit 304a includes a VBUSIN_B terminal. The USB function unit 304a operates when a predetermined voltage is supplied to the VBUSIN_B terminal. The USB function of the CPU 304 can operate independent from the main functions of the CPU 304.

The power required to operate the USB function unit 304a of the CPU 304 is much lower than the power required to operate the main functions of the CPU 304. The USB function unit 304a has a type determination function and a USB signal process function. The type determination function is a function of determining with which of multiple USB standards the power supply apparatus 401 connected to the electronic device 301 is compliant. USB 2.0, USB 3.0, USB 3.1, USB BC, USB PD, USB Type-C, or the like can be given as examples of the multiple USB standards. The USB function unit 304a can determine the type of the power supply apparatus 401 on the basis of a voltage at the VBUS terminals or the CC terminals, for example. Additionally, the USB function unit 304a can determine the type of the power supply apparatus 401 through communication or the like carried out through the D+/D− terminals or the CC terminals, for example.

The USB function unit 304a of the CPU 304 includes a D+_B terminal and a D−_B terminal. The D+_B terminal of the USB function unit 304a can be connected to the D+ terminal of the USB connector 390 via the selector switch 313. The D−_B terminal of the USB function unit 304a can be connected to the D− terminal of the USB connector 390 via the selector switch 313. By sending and receiving signals through the D+_B terminal and the D−_B terminal, the USB function unit 304a of the CPU 304 can carry out an enumeration process with the power supply apparatus 401 connected to the electronic device 301. When the enumeration process is successful, the CPU 304 can determine whether the power supply apparatus 401 connected to the electronic device 301 is compliant with USB 2.0, USB 3.0, or USB 3.1.

The USB function unit 304a of the CPU 304 further includes a CC1_B terminal and a CC2_B terminal. The CC1_B terminal of the USB function unit 304a can be connected to the CC1 terminal of the USB connector 390 via the selector switch 313. The CC2_B terminal of the USB function unit 304a can be connected to the CC2 terminal of the USB connector 390 via the selector switch 313. The USB function unit 304a further includes a TX+ terminal and a TX− terminal. The TX+ terminal of the USB function unit 304a is connected to the TX+ terminal of the USB connector 390. The TX− terminal of the USB function unit 304a is connected to the TX− terminal of the USB connector 390. The USB function unit 304a further includes a RX+ terminal and a RX− terminal. The RX+ terminal of the USB function unit 304a is connected to the RX+ terminal of the USB connector 390. The RX− terminal of the USB function unit 304a is connected to the RX− terminal of the USB connector 390.

The CPU 304 further includes an AUTH_I/F terminal. The AUTH_I/F terminal of the CPU 304 is used for an authentication process carried out between the CPU 304 and the battery 320. The authentication process carried out between the CPU 304 and the battery 320 will be described later.

The CPU 304 further includes a SUSPEND_IN_B terminal. A SUSPEND signal output from the power source control unit 303 is inverted by the inverter 394, and the SUSPEND signal inverted by the inverter 394 is input to the SUSPEND_IN_B terminal of the CPU 304. The CPU 304 further includes a VDDEN_OUT terminal. The inverter 394 is enabled only while a VDDEN_OUT signal is being output from the CPU 304. Accordingly, the SUSPEND signal output from the power source control unit 303 can be input to the SUSPEND_IN_B terminal of the CPU 304 only while the VDDEN_OUT signal is being output from the CPU 304.

The CPU 304 further includes a VTEST1_RES_IN terminal. In the electronic device 301, a VTEST1_RES signal output from the power source control unit 303 is inverted by the inverter 395, and the VTEST1_RES signal inverted by the inverter 395 is input to the VTEST1_RES_IN terminal of the CPU 304. The inverter 395 is enabled only while the VDDEN_OUT signal is being output from the CPU 304. Accordingly, the VTEST1_RES signal output from the power source control unit 303 can be input to the VTEST1_RES_IN terminal of the CPU 304 only while the VDDEN_OUT signal is being output from the CPU 304.

The CPU 304 further includes a VTEST2_RES_IN terminal. A VTEST2_RES signal output from the power source control unit 303 is inverted by the inverter 396, and the VTEST2_RES signal inverted by the inverter 396 is input to the VTEST2_RES_IN terminal of the CPU 304. The inverter 396 is enabled only while the VDDEN_OUT signal is being output from the CPU 304. Accordingly, the VTEST2_RES signal output from the power source control unit 303 can be input to the VTEST2_RES_IN terminal of the CPU 304 only while the VDDEN_OUT signal is being output from the CPU 304.

The battery charging IC 302 can charge the battery 320, which includes a battery cell 321. The battery charging IC 302 includes a VBUSIN_A terminal. The battery charging IC 302 charges the battery 320 while a predetermined voltage is being input to the VBUSIN_A terminal of the battery charging IC 302. The battery charging IC 302 further includes a VOUT_PWR terminal. The battery charging IC 302 transforms the voltage supplied to the VBUSIN_A terminal to a predetermined voltage VOUT_PWR, and outputs the predetermined voltage VOUT_PWR from the VOUT_PWR terminal. The power source IC 312 includes a VIN_D terminal. The voltage output from the VOUT_PWR terminal of the battery charging IC 302 is input to the VIN_D terminal of the power source IC 312. The battery charging IC 302 can function as a charging unit that charges the battery 320 with the power received from the power supply apparatus 401.

The battery charging IC 302 further includes a BAT terminal. When the predetermined voltage is not being input to the VBUSIN_A terminal of the battery charging IC 302, the battery charging IC 302 can supply a voltage VBATT, which is to be supplied from the battery 320 to the BAT terminal, to the power source IC 312 via the VOUT_PWR terminal.

The battery charging IC 302 also has a type determination function. The type determination function of the battery charging IC 302 is the same as the type determination function of the CPU 304 and will therefore not be described.

The battery charging IC 302 further includes a CHG_TYPE_OUT terminal. The battery charging IC 302 outputs a CHG_TYPE signal, which indicates a result of the type determination for the power supply apparatus 401, from the CHG_TYPE_OUT terminal. The CHG_TYPE signal output from the CHG_TYPE_OUT terminal of the battery charging IC 302 is input to an AND gate 371 of the power source control unit 303. If the power supply apparatus 401 has been determined, by the type determination function, to be compliant with USB BC or USB Type-C, the battery charging IC 302 outputs an H-level CHG_TYPE signal, for example. However, if the power supply apparatus 401 has been determined, by the type determination function, to not be compliant with either of USB BC and USB Type-C, the battery charging IC 302 outputs a L-level CHG_TYPE signal, for example.

The battery charging IC 302 further includes a SUSPEND_IN_A terminal. The SUSPEND signal output from the power source control unit 303 is input to the SUSPEND_IN_A terminal of the battery charging IC 302. When the SUSPEND signal input to the SUSPEND_IN_A terminal is at H level, the battery charging IC 302 limits the current received from the power supply apparatus 401 via the VBUS terminal to a suspend current, which is 2.5 mA, for example. On the other hand, when the SUSPEND signal input to the SUSPEND_IN_A terminal is at L level, the battery charging IC 302 limits the current supplied from the power supply apparatus 401 via the VBUS terminal to a current value different from the suspend current.

In the first embodiment, the state in which the current supplied from the power supply apparatus 401 via the VBUS terminal has been limited to the suspend current of 2.5 mA, for example, will be called a "suspended state". When the SUSPEND signal input to the SUSPEND_IN_A terminal is at H level, i.e., when in the suspended state, the battery charging IC 302 does not charge the battery 320.

When the SUSPEND signal input to the SUSPEND_IN_A terminal is at L level, the battery charging IC 302 may limit the current supplied from the power supply apparatus 401 via the VBUS terminal in accordance with the type determined by the type determination function.

The battery charging IC 302 further includes a BUS terminal. The CPU 304 further includes a BUS terminal. The BUS terminal of the battery charging IC 302 and the BUS terminal of the CPU 304 are connected by a bus line. The battery charging IC 302 can acquire information indicating the state of the battery charging IC 302, and information indicating the state of the battery 320, from the CPU 304 via the bus line. Additionally, the CPU 304 can control a register of the battery charging IC 302 over the bus line.

The battery 320 includes at least the battery cell 321, a thermistor 322, and an authentication unit 323. The battery 320 is a lithium-ion battery, for example. The battery 320 can be removed from the electronic device 301 by a user.

The electronic device 301 includes a compartment 320a that accommodates the battery 320. The compartment 320a includes a TM_AUTH terminal, a TM_VBATT terminal, a TM_THM terminal, and a TM_GND terminal. The authentication unit 323 is connected to the AUTH_I/F terminal of the CPU 304 via the TM_AUTH terminal. A positive terminal of the battery cell 321 is connected to the BAT terminal of the battery charging IC 302 via the TM_VBATT terminal. The battery charging IC 301 further includes a THM terminal. One end of the thermistor 322 is connected to the THM terminal of the battery charging IC 301 via the TM_THM terminal. A negative terminal of the battery cell 321 and the other end of the thermistor 322 are connected to the TM_GND terminal, which is a ground terminal.

The authentication unit 323 ensures that the battery 320 is a predetermined battery having predetermined charging characteristics. If authentication between the CPU 304 and the authentication unit 323 has succeeded, the battery charging IC 302 charges the battery 320 at a current value appropriate for the charging characteristics of the battery 320. However, if authentication between the CPU 304 and the electronic device 301 has not succeeded, the battery charging IC 302 does not charge the battery 320, in order to ensure safety.

Although the first embodiment describes a case where the battery 320 is not charged if the authentication between the CPU 304 and the authentication unit 323 has not succeeded as an example, the configuration is not limited thereto. For example, safety may be ensured by limiting the current for charging the battery 320 if the authentication between the CPU 304 and the authentication unit 323 has not succeeded.

The thermistor 322 is a Negative Temperature Coefficient (NTC) thermistor, for example. NTC thermistors have characteristics in which the resistance value drops as the temperature rises.

The battery charging IC 302 further includes a VREFOUT terminal. A wire connecting the THM terminal of the battery charging IC 302 to one end of the thermistor 322 is connected to the VREFOUT terminal of the battery charging IC 302 via the pull-up resistor 393.

The power source IC 311 includes a VIN_C terminal, which is an input terminal; an EN_C terminal, which is an enable terminal; and a VOUT_C terminal, which is an output terminal. The voltage supplied from the power supply apparatus 401 is input to the VIN_C terminal of the power source IC 311 via the VBUS terminal. The power source IC 311 outputs a power source voltage VDD, which is obtained by transforming the voltage supplied to the VIN_C terminal, from the VOUT_C terminal. The VOUT_C terminal of the power source IC 311 is connected to the VBUSIN_B terminal of the USB function unit 304a of the CPU 304. The power source IC 311 controls whether or not to supply power to the CPU 304 via the VOUT_C terminal on the basis of a voltage input to the EN_C terminal.

The power source IC 312 includes the VIN_D terminal, which is an input terminal; an EN_D terminal, which is an enable terminal; and a VOUT_D terminal, which is an output terminal. The voltage output from the VOUT_PWR terminal of the battery charging IC 302 is supplied to the VIN_D terminal of the power source IC 312. The power source IC 312 outputs a voltage, obtained by transforming the voltage supplied to the VIN_D terminal, from the VOUT_D terminal. The VOUT_D terminal of the power source IC 312 is connected to the VDDIN_CPU terminal of the CPU 304. The power source IC 312 controls whether or not to supply power to the CPU 304 via the VOUT_D terminal on the basis of a control signal input to the EN_D terminal.

The selector switch 313 is a component for switching between connecting the D+ terminal, the D− terminal, the CC1 terminal, and the CC2 terminal of the USB connector 390 to the CPU 304 or to the battery charging IC 302. The selector switch 313 includes a VIN_E terminal for supplying power to the selector switch 313. The voltage output from the VOUT_C terminal of the power source IC 311 is supplied to the VIN_E terminal of the selector switch 313. The selector switch 313 further includes a BUSSEL_IN terminal. The CPU 304 further includes a BUSSEL_OUT terminal. The BUSSEL_IN terminal of the selector switch 313 is connected to the BUSSEL_OUT terminal of the CPU 304. The selector switch 313 switches where the D+ terminal, the D− terminal, the CC1 terminal, and the CC2 terminal of the USB connector 390 are connected to on the basis of a signal supplied from the BUSSEL_OUT terminal of the CPU 304 to the BUSSEL_IN terminal of the selector switch 313.

The selector switch 313 includes a node COM1, a node COM2, a node COM3, and a node COM4. The battery charging IC 302 further includes a D+A terminal, a D-A terminal, a CC1_A terminal, and a CC2_A terminal. When the voltage output from the BUSSEL_OUT terminal of the CPU 304 is at L level, the selector switch 313 is in a state such as that described next, for example. The node COM1, which is connected to the D+ terminal of the USB connector 390, is connected to the D+A terminal of the battery charging IC 302. The node COM2, which is connected to the D− terminal of the USB connector 390, is connected to the D-A terminal of the battery charging IC 302. The node COM3, which is connected to the CC1 terminal of the USB connector 390, is connected to the CC1_A terminal of the battery charging IC 302. The node COM4, which is connected to the CC2 terminal of the USB connector 390, is connected to the CC2_A terminal of the battery charging IC 302. The type determination is carried out by the battery charging IC 302 in such a state.

When the voltage output from the BUSSEL_OUT terminal of the CPU 304 is at H level, the selector switch 313 is in a state such as that described next, for example. The node COM1, which is connected to the D+ terminal of the USB connector 390, is connected to the D+_B terminal of the CPU 304. The node COM2, which is connected to the D− terminal of the USB connector 390, is connected to the D−_B terminal of the CPU 304. The node COM3, which is connected to the CC1 terminal of the USB connector 390, is connected to the CC1_B terminal of the CPU 304. The node COM4, which is connected to the CC2 terminal of the USB connector 390, is connected to the CC2_B terminal of the CPU 304. The type determination is carried out by the CPU 304 in such a state.

The function unit 315 is an image capture function unit, for example. The image capture function unit includes at least an imaging element and an image processing unit. The imaging element generates digital image data from an optical image formed on an imaging surface through a lens unit, and outputs the generated digital image data. The lens unit may be a unit that is removable from the electronic device 301 by the user, or may be a unit that cannot be easily removed from the electronic device 301 by the user. The lens unit includes an optical lens and a driving unit that drives the optical lens, for example. The image processing unit carries out a predetermined image process so as to process the image data output from the imaging element. The CPU 304 includes an F1_BUS terminal. The function unit 315 is connected to the F1_BUS terminal of the CPU 304 via the bus line.

Although not particularly limited, the function unit 316 is a storage function unit, for example. A storage medium (not shown) is connected to the storage function unit. The storage medium may be a medium that is removable from the storage function unit by the user, or may be a medium that cannot be easily removed from the storage function unit by the user. The storage function unit can write image data or the like into the storage medium, and can read image data or the like out from the storage medium. A flash memory card or the like, for example, can be given as an example of the storage medium, but the storage medium is not limited thereto. The CPU 304 includes an F2_BUS terminal. The function unit 316 is connected to the F2_BUS terminal of the CPU 304 via the bus line.

Although not particularly limited, the function unit 317 is a display function unit, for example. The display function unit is constituted by a liquid crystal display (LCD) or the like. Captured images, information relating to the electronic device 301, or the like can be displayed in the display function unit. The CPU 304 includes an F3_BUS terminal. The function unit 317 is connected to the F3_BUS terminal of the CPU 304 via the bus line.

The switch 318 is a pushbutton switch, for example. One end of the switch 318 is connected to the TM_VBATT terminal. The other end of the switch 318 is connected to an input terminal of the OR gate 319. When the switch 318 is turned on, an H-level signal based on the potential at the TM_VBATT terminal is input to the OR gate 319 via the switch 318 as an HW_LAT_PSW signal.

The OR gate 319 is a three-input OR gate. The HW_LAT_PSW signal is input to the OR gate 319 as mentioned above. The VDDEN_OUT signal output from the VDDEN_OUT terminal of the CPU 304 is also input to the OR gate 319. An HW_LAT_OS signal output from the power source control unit 303 is supplied to the OR gate 319.

Upon any one of the HW_LAT_PSW signal, the HW_LAT_OS signal, and the VDDEN_OUT signal going to H level, the OR gate 319 supplies an H-level control signal to the EN_D terminal of the power source IC 312. The power source IC 312 turns on upon the H-level control signal being input to the EN_D terminal. Upon turning on, the power source IC 312 outputs a voltage, obtained by transforming the voltage supplied to the VIN_D terminal, from the VOUT_D terminal. As a result, a predetermined voltage is supplied to the VDDIN_CPU terminal of the CPU 304, and the CPU 304 carries out its main functions. In the first embodiment, the HW_LAT_PSW signal, the HW_LAT_OS signal, and the VDDEN_OUT signal are all called "activation signals".

The anode of the LED 392 is connected to the VOUT_PWR terminal of the battery charging IC 302 via the resistor 391. The cathode of the LED 392 is connected to an LED_OUT terminal of the battery charging IC 302. In the first embodiment, the output format of the LED_OUT terminal of the battery charging IC 302 is an open collector or an open drain. The battery charging IC 302 lights the LED 392 by carrying out control so that current flows to the LED_OUT terminal, and extinguishes the LED 392 be carrying out control so that current does not flow to the LED_OUT terminal.

The LED 392 is used for displaying whether or not charging operations are being carried out by the electronic device 301. When the battery charging IC 302 is charging the battery 320, the battery charging IC 302 puts the LED 392 into a lighted state. However, when the battery charging IC 302 is not charging the battery 320, the battery charging IC 302 puts the LED 392 into an extinguished state.

By carrying out a load test with the power supply apparatus 401, the power source control unit 303 can detect the actual power supply capability of the power supply apparatus 401. The power source control unit 303 can put the battery charging IC 302 or the like into a suspended state. The power source control unit 303 can function as a testing unit that carries out a test for detecting the power supply capability of the power supply apparatus 401. The power source control unit 303 can also function as a testing unit that carries out a test for detecting the actual power supply capability of the power supply apparatus 401 in a state where the battery charging IC 302 has limited the power received from the power supply apparatus 401. Details of operations of the power source control unit 303 will be given later.

A power source voltage VDD is supplied to a power source line VDDIN_CIR of the power source control unit 303, from the VOUT_C terminal of the power source IC 311. When the VBUS power source 402 of the power supply apparatus 401 is connected to the VIN_C terminal and the EN_C terminal of the power source IC 311, the power source voltage VDD is supplied to the power source line VDDIN_CIR of the power source control unit 303 from the VOUT_C terminal of the power source IC 311.

Upon transitioning from a state where the power source voltage is not being supplied to the power source control unit 303 to a state where the power source voltage is supplied to the power source control unit 303, the power source control unit 303 behaves as follows. The logic of the circuits in the power source control unit 303 is reset to a default state, and the functions of the circuits in the power source control unit 303 are negated. On the other hand, upon transitioning from a state where the power source voltage is being supplied to the power source control unit 303 to a state where the power source voltage is not supplied to the power source control unit 303, the functions of the circuits of the power source control unit 303 are negated.

The power source control unit 303 includes a buffer 331, an N-channel MOSFET 332, a pull-down resistor 333, a P-channel MOSFET 334, a pull-up resistor 335, and a delay circuit 342. The power source voltage is supplied to an input terminal of the buffer 331. When the power source voltage is at H level, the buffer 331 supplies an H-level VB1_DET_EN signal to the gate of the N-channel MOSFET 332 and the delay circuit 342. When the power source voltage is at L level, the buffer 331 supplies an L-level VB1_DET_EN signal to the gate of the N-channel MOSFET 332 and the delay circuit 342. One end of the pull-down resistor 333 is connected to the gate of the N-channel MOSFET 332. The other end of the pull-down resistor 333 is connected to a ground. The source of the N-channel MOSFET 332 is connected to a ground. The N-channel MOSFET 332 is controlled to turn on or off by the VB1_DET_EN signal.

Although an example in which the N-channel MOSFET 332 is used is described here, the configuration is not limited thereto. An element that is in an electrified state when it turns on and a high-impedance state when it turns off can be used as well. An NPN transistor can be given as an example of such an element.

The drain of the N-channel MOSFET 332 is connected to the gate of the P-channel MOSFET 334. One end of the pull-up resistor 335 is connected to the drain of the N-channel MOSFET 332 and the gate of the P-channel MOSFET 334. The other end of the pull-up resistor 335 is connected to the source of the P-channel MOSFET 334. The P-channel MOSFET 334 is controlled to turn on or off by the on or off action of the N-channel MOSFET 332.

Although an example in which the P-channel MOSFET 334 is used is described here, the configuration is not limited thereto. An element that is in an electrified state when it turns on and a high-impedance state when it turns off can be used as well. A PNP transistor can be given as an example of such an element.

The power source control unit 303 further includes a delay circuit 372, an N-channel MOSFET 382, a pull-down resistor 383, a P-channel MOSFET 384, and a pull-up resistor 385. A VB2_DET_EN signal output from the delay circuit 372 is supplied to the gate of the N-channel MOSFET 382. One end of the pull-down resistor 383 is connected to the gate of the N-channel MOSFET 382. The other end of the pull-down resistor 383 is connected to a ground. The source of the N-channel MOSFET 382 is connected to a ground. The N-channel MOSFET 382 is controlled to turn on or off by the VB2_DET_EN signal.

Although an example in which the N-channel MOSFET 382 is used is described here, the configuration is not limited thereto. An element that is in an electrified state when it turns on and a high-impedance state when it turns off can be used as well. An NPN transistor can be given as an example of such an element.

The drain of the N-channel MOSFET 382 is connected to the gate of the P-channel MOSFET 384. One end of the pull-up resistor 385 is connected to the drain of the N-channel MOSFET 382 and the gate of the P-channel MOSFET 384. The other end of the pull-up resistor 385 is connected to the source of the P-channel MOSFET 384. The P-channel MOSFET 384 is controlled to turn on or off by the on or off action of the N-channel MOSFET 382.

Although an example in which the P-channel MOSFET 384 is used is described here, the configuration is not limited thereto. An element that is in an electrified state when it turns on and a high-impedance state when it turns off can be used as well. A PNP transistor can be given as an example of such an element.

The power source control unit 303 further includes a resistor 336, an N-channel MOSFET 337, and a resistor 386. The drain of the P-channel MOSFET 334 is connected to one end of the resistor 336. The other end of the resistor 336 is connected to the drain of the N-channel MOSFET 337. The drain of the P-channel MOSFET 384 is connected to one end of the resistor 386. The other end of the resistor 386 is connected to the drain of the N-channel MOSFET 337.

The source of the N-channel MOSFET 337 is connected to a ground. When the N-channel MOSFET 337 turns on, the drain of the P-channel MOSFET 334 is connected to the ground via the resistor 336 and the N-channel MOSFET 337. Additionally, when the N-channel MOSFET 337 turns on, the drain of the P-channel MOSFET 384 is connected to the ground via the resistor 386 and the N-channel MOSFET 337.

The power source control unit 303 further includes resistors 347 and 348. One end of the resistor 347 is connected to the drain of the P-channel MOSFET 334. The other end of the resistor 347 is connected to one end of the resistor 348. The other end of the resistor 348 is connected to a ground. The drain of the P-channel MOSFET 334 is connected to the ground via the resistor 347 and the resistor 348. The potential at the drain of the P-channel MOSFET 334 is divided by the resistor 347 and resistor 348. A VBUS voltage from the VBUS power source 402 is applied to the source of the P-channel MOSFET 334 via the VBUS terminal of the USB connector 403 and the VBUS terminal of the USB connector 390. When the P-channel MOSFET 334 is on, the VBUS voltage is divided by the resistor 347 and resistor 348. A VB_COMP signal is obtained by the resistor 347 and the resistor 348 dividing the VBUS voltage.

The power source control unit 303 further includes resistors 338 and 339, a diode 340, a capacitor 341, and a one-shot timer 357. One end of the resistor 339 is connected to an output terminal of the one-shot timer. The other end of the resistor 339 is connected to one end of the resistor 338 and the cathode of the diode 340. The other end of the resistor 338 is connected to the anode of the diode 340, one end of the capacitor 341, and the gate of the N-channel MOSFET 337. The other end of the capacitor 341 is connected to a ground.

An LD_FET_OS signal output from the one-shot timer 357 is supplied to the gate of the N-channel MOSFET 337 via the resistor 339 and the resistor 338. The N-channel MOSFET 337 is controlled to turn on or off by the LD_FET_OS signal supplied from the one-shot timer 357.

When the P-channel MOSFET 334 is on and the N-channel MOSFET 337 is on, a load test current LOAD_CURR flows to a load unit 377 via a VBUS line. The load unit 377 includes the P-channel MOSFETs 334 and 384, the N-channel MOSFET 337, and the resistors 336 and 386.

In the first embodiment, a state where the load test current LOAD_CURR is zero will be called a state where the load test current LOAD_CURR is off, and a state where the load test current LOAD_CURR is saturated will be called a state where the load test current LOAD_CURR is on.

When the LD_FET_OS signal output from the one-shot timer 357 transitions from L level to H level, the capacitor 341 is charged via the resistor 339 and the resistor 338, and the potential at the gate of the N-channel MOSFET 337 gradually rises. As a result, the load test current LOAD_CURR gradually increases and eventually saturates.

When the LD_FET_OS signal output from the one-shot timer 357 transitions from H level to L level, the charge in the capacitor 341 is discharged via the diode 340 and the resistor 339. The potential at the gate of the N-channel MOSFET 337 quickly drops as a result. The load test current LOAD_CURR quickly decreases and eventually reaches zero.

In this manner, when causing the load test current LOAD_CURR to transition from off state to on state, the load test current LOAD_CURR increases gradually. However, when causing the load test current LOAD_CURR to transition from on state to off state, the load test current LOAD_CURR decreases quickly.

In the first embodiment, when causing the load test current LOAD_CURR to transition from off state to on state, the load test current LOAD_CURR changes gradually. This makes it possible to suppress the influence of transient response on the VBUS power source 402 of the power supply apparatus 401, which in turn makes it possible to implement load testing with a constant current.

Additionally, in the first embodiment, when the load test current LOAD_CURR is caused to transition from on state to off state, the load test current LOAD_CURR changes quickly. Accordingly, the load test current LOAD_CURR can be quickly turned off when the VBUS voltage has fallen to a predetermined value during the load test. Accordingly, the VBUS voltage can be prevented from dropping below the minimum operating voltage of the circuits in the power source IC 311 and the circuits in the battery charging IC 302 during the load test. As such, a situation where the power source IC 311 and the battery charging IC 302 are reset during the load test can be prevented.

The power source control unit 303 further includes comparators 343 and 345 and an OR gate 349. A reference voltage VtA is applied to a VIN+ terminal of the comparator 343. The VB_COMP signal is input to a VIN− terminal of the comparator 343.

In the first embodiment, the reference voltage VtA is set in accordance with a charging port undershoot voltage defined by USB BC. If the VBUS voltage is 5 V, for example, the reference voltage VtA is set to approximately 4.1 V. Note that the reference voltage VtA is not limited to 4.1 V. However, it is preferable that the VBUS voltage not drop below the minimum operating voltage of the circuits in the power source IC 311 and the circuits in the battery charging IC 302 even when the VBUS voltage drops due to the load test being carried out. It is thus preferable that the reference voltage VtA be set in light of this standpoint.

The comparator 343 compares the potential at the VIN+ terminal with the potential at the VIN− terminal. The comparator 343 outputs an H-level VB_CP_OUTA signal when the potential at the VIN+ terminal is higher than the reference voltage, which corresponds to the potential at the VIN− terminal. In other words, the comparator 343 outputs an H-level VB_VP_OUTA signal when the potential at the VIN− terminal is less than a threshold. On the other hand, the comparator 343 outputs an L-level VB_CP_OUTA signal when the potential at the VIN− terminal is higher than the potential at the VIN+ terminal. The VB_CP_OUTA signal is input to the OR gate 349.

The VB_COMP signal is input to a VIN+ terminal of the comparator 345. A reference voltage VtB is applied to a VIN− terminal of the comparator 345.

In the first embodiment, the reference voltage VtB is set in accordance with a charging port overshoot voltage defined by USB BC. If the VBUS voltage is 5 V, for example, the reference voltage VtB is set to approximately 6.0 V. Note that the reference voltage VtB is not limited to 6.0 V. However, it is preferable that the following take place when the load test current LOAD_CURR flows to the resistors 336 and 386 during the load test. In other words, in such a situation, it is preferable that the magnitude of the load test current LOAD_CURR and the time for which the load test current LOAD_CURR flows do not exceed the rated power of the resistors 336 and 386. It is therefore preferable that VtB be set in light of such a standpoint.

The comparator 345 compares the potential at the VIN+ terminal with the potential at the VIN− terminal. The comparator 345 outputs an H-level VB_CP_OUTB signal when the potential at the VIN+ terminal is higher than the potential at the VIN− terminal. On the other hand, the comparator 345 outputs an L-level VB_CP_OUTB signal when the potential at the VIN− terminal is higher than the potential at the VIN+ terminal. The VB_CP_OUTB signal is input to the OR gate 349.

The delay circuit 342 produces delay equivalent to a predetermined time TdlyA in the VB1_DET_EN signal supplied from the buffer 331. The delay circuit 342 outputs a VB1_DET_DLY signal obtained by delaying the VB1_DET_EN signal. The power source control unit 303 further includes AND gates 351 and 355 and a D flip-flop 367. The AND gate 355 is a three-input AND gate. The VB1_DET_DLY signal output from the delay circuit 342 is input to the AND gate 351. Additionally, the VB1_DET_DLY signal output from the delay circuit 342 is input to the AND gate 355. Furthermore, the VB1_DET_DLY signal output from the delay circuit 342 is input to a D2 terminal, which is an input terminal of the D flip-flop 367. The predetermined time TdlyA is set on the basis of a time until the VB_COMP signal input to the comparators 343 and 345 stabilizes after the P-channel MOSFET 334 has turned on in response to the VB1_DET_EN signal.

The power source control unit 303 further includes an inverter 350 and an AND gate 361. A VB_ERR signal output from the OR gate 349 is input to the inverter 350, the AND gate 351, and the AND gate 361. When the VBUS voltage drops below a lower limit value or when the VBUS voltage rises above an upper limit value, a VBUS voltage error arises in the load test, and the OR gate 349 outputs an H-level VB_ERR signal.

The inverter 350 outputs a /VB_ERR signal, obtained by inverting the VB_ERR signal. The /VB_ERR signal is input to the AND gate 355. Note that a /VB_OK_LAT signal (described later) is supplied to the AND gate 355.

The power source control unit 303 further includes an OR gate 352, an AND gate 353, and an OR gate 354. The signal output from the AND gate 351 is input to the OR gate 352. Note that a SUSP_LAT signal (described later) is also input to the OR gate 352. The signal output from the OR gate 352 is input to the AND gate 353. Note that the /VB_OK_LAT signal (described later) is also input to the AND gate 353. The signal output from the AND gate 353 is input to the OR gate 354. Note that the LD_FET_OS signal output from the one-shot timer 357 is also input to the OR gate 354.

The OR gate 354 outputs the SUSPEND signal. The SUSPEND signal output from the OR gate 354 is input to the SUSPEND_IN_A terminal of the battery charging IC 302. Additionally, the SUSPEND signal output from the OR gate 354 is input to the inverter 394. The SUSPEND signal inverted by the inverter 394 is input to the SUSPEND_IN_B terminal of the CPU 304.

The power source control unit 303 further includes an OR gate 356 and an AND gate 375. The signal output from the AND gate 355 is input to the OR gate 356. The signal output from the AND gate 375 is also supplied to the OR gate 356.

The AND gate 355 is at H level when the VB1_DET_DLY signal transitions from L level to H level prior to the start of a first load test, and when the /VB_ERR signal is at H level. Note that the H-level /VB_ERR signal indicates that the VBUS voltage is not in an error state.

The signal output from the OR gate 356 is input to the AND gate 361 and the one-shot timer 357. Upon the input signal transitioning from L level to H level, the one-shot timer 357 outputs the LD_FET_OS signal, which is at H level only for a predetermined time TosA. During the predetermined time TosA, the one-shot timer 357 does not output the H-level LD_FET_OS signal, even if the input signal has again transitioned from L level to H level.

The one-shot timer 357 includes a /OSARST terminal, which is a reset terminal. A /SUSP_LAT signal (described later) is input to the /OSARST terminal of the one-shot timer 357. The one-shot timer 357 outputs an L-level LD_FET_OS signal when the /SUSP_LAT signal input to the /OSARST terminal is at L level. The one-shot timer 357 outputs the L-level LD_FET_OS signal when the L-level /SUSP_LAT signal is supplied to the /OSARST terminal, even before the predetermined time TosA has elapsed following the start of the output of the H-level LD_FET_OS signal.

The LD_FET_OS signal output from the one-shot timer 357 is supplied to the gate of the N-channel MOSFET 337 via the resistors 339 and 338, as described above. Additionally, the LD_FET_OS signal output from the one-shot timer 357 is also input to the OR gate 354, as described above. The power source control unit 303 further includes an inverter 366 and a D flip-flop 362. The LD_FET_OS signal output from the one-shot timer 357 is also input to the inverter 366. The LD_FET_OS signal output from the one-shot timer 357 is also input to a D1 terminal, which is an input terminal of the D flip-flop 362.

As described above, the LD_FET_OS signal goes to H level only for the predetermined time TosA. When the LD_FET_OS signal goes to H level, the N-channel MOSFET 337 turns on. The N-channel MOSFET 337 is off while the LD_FET_OS signal is at L level. The magnitude of the load test current LOAD_CURR and the time for which the load test current LOAD_CURR flows are set primarily on the basis of the resistance value of the resistor 336, the resistance value of the resistor 386, and the predetermined time TosA.

In the first embodiment, the load test current LOAD_CURR is set as follows when the VB1_DET_EN signal is at H level and the VB2_DET_EN signal is at L level. That is, in the first embodiment, the load test current LOAD_CURR is set as follows when the P-channel MOSFET 334 is on and the P-channel MOSFET 384 is off. In such a case, the settings are made so that the magnitude of the load test current LOAD_CURR is 0.5 A, for example, and the time for which the load test current LOAD_CURR flows is 2 ms, for example.

In the first embodiment, the load test current LOAD_CURR is set as follows when the VB1_DET_EN signal is at H level and the VB2_DET_EN signal is at H level. That is, in the first embodiment, the load test current LOAD_CURR is set as follows when the P-channel MOSFET 334 is on and the P-channel MOSFET 384 is on. In such a case, the settings are made so that the magnitude of the load test current LOAD_CURR is 1.5 A, for example, and the time for which the load test current LOAD_CURR flows is 2 ms, for example.

Note, however, that the magnitude of the load test current LOAD_CURR and the time for which the load test current LOAD_CURR flows are not limited to the above values.

Preferably, the magnitude of the load test current LOAD_CURR and the time for which the load test current LOAD_CURR flows are set in light of the following standpoint. In USB 2.0, the maximum value of the VBUS voltage is defined as 5.25 V. Additionally, in USB 2.0, the additional capacitance of the VBUS line is defined as 120 uF or more. It is preferable that the magnitude of the load test current LOAD_CURR and the time for which the load test current LOAD_CURR flows be set so that the charge can be sufficiently discharged from the additional capacitance of the VBUS line.

As described above, the VB_ERR signal output from the OR gate 349 and the signal output from the OR gate 356 are input to the AND gate 361. The power source control unit 303 further includes an OR gate 363. The signal output from the AND gate 361 is input to the OR gate 363.

The signal output from the OR gate 363 is supplied to a CLK1 terminal, which is a clock input terminal of the D flip-flop 362. The D flip-flop 362 outputs the SUSP_LAT signal from a Q1 terminal, which is an output terminal. The power source control unit 303 further includes an AND gate 364, an inverter 365, and a one-shot timer 370. The SUSP_LAT signal output from the D flip-flop 362 is input to the OR gate 363, the OR gate 352, and the AND gate 364. Note that a /VB1_OK_LAT signal output from a /Q2 terminal, which is an output terminal of the D flip-flop 367, is also input to the AND gate 364.

The signal output from the AND gate 364 is input to the inverter 365. The inverter 365 supplies a signal obtained by inverting the signal supplied from the AND gate 364 to a /OSBRST terminal of the one-shot timer 370.

The D flip-flop 362 outputs the /SUSP_LAT signal from a /Q1 terminal, which is an inverted output terminal. The power source control unit 303 further includes AND gates 371 and 376. The AND gate 371 is a three-input AND gate. The /SUSP_LAT signal is input to the /OSARST terminal of the one-shot timer 357. The /SUSP_LAT signal is also input to the AND gate 371 and the AND gate 376.

As described above, the LD_FET_OS signal output from the one-shot timer 357 is also input to the D1 terminal, which is an input terminal of the D flip-flop 362. The H-level LD_FET_OS signal is input to the D1 terminal of the D flip-flop 362 only during the above-described predetermined time TosA. When the VB_ERR signal transitions from L level to H level during the predetermined time TosA, the Q1 terminal of the D flip-flop 362 is latched at H level, and the /Q1 terminal of the D flip-flop 362 is latched at L level.

When the Q1 terminal of the D flip-flop 362 is latched at H level, the signal input to the CLK1 terminal of the D flip-flop 362 is fixed at H level. Accordingly, even if the VB_ERR signal transitions thereafter, neither the SUSP_LAT signal output from the Q1 terminal nor the /SUSP_LAT signal output from the /Q1 terminal will transition.

As described above, when the VBUS voltage drops below a lower limit value or when the VBUS voltage rises above an upper limit value, a VBUS voltage error arises in the load test, and the OR gate 349 outputs the H-level VB_ERR signal. The H-level VB_ERR signal output from the OR gate 349 is an error signal indicating that an error has arisen in the VBUS voltage during the load test. When the error signal, indicating that an error has arisen in the VBUS voltage, has been emitted during the load test period, the D flip-flop 362 latches the error signal. On the other hand, when the error signal, indicating that an error has arisen in the VBUS voltage, has been emitted during a period outside the load test period, the D flip-flop 362 does not latch the error signal.

When an error has arisen in the VBUS voltage, the SUSP_LAT signal output from the Q1 terminal of the D flip-flop 362 is latched at H level. The SUSP_LAT signal latched at H level is output from the power source control unit 303, as the SUSPEND signal, through the OR gate 352, the AND gate 353, and the OR gate 354. The SUSPEND signal output from the power source control unit 303 is supplied to the SUSPEND_IN_A terminal of the battery charging IC 302. Additionally, the SUSPEND signal output from the power source control unit 303 is inverted by the inverter 394, and the signal inverted by the inverter 394 is supplied to the SUSPEND_IN_B terminal of the CPU 304.

The battery charging IC 302 enters a suspended state upon the H-level SUSPEND signal being input to the SUSPEND_N_A terminal.

Because the SUSPEND signal is inverted by the inverter 394, a L-level signal is supplied to the SUSPEND_IN_B terminal of the CPU 304 when the H-level SUSPEND signal has been output from the power source control unit 303. The CPU 304 detects that the SUSPEND signal is being output from the power source control unit 303 on the basis of the signal being input to the SUSPEND_IN_B terminal being L level. Additionally, the CPU 304 detects that the battery charging IC 302 is in a suspended state on the basis of the signal being input to the SUSPEND_IN_B terminal being L level.

When an error has arisen in the VBUS voltage, the SUSP_LAT signal output from the Q1 terminal of the D flip-flop 362 is latched at H level. The signal output from the AND gate 364 goes to H level when the SUSP_LAT signal is at H level and the /VB1_OK_LAT signal output from the /Q2 terminal of the D flip-flop 367 is also H level. The H-level signal output from the AND gate 364 is inverted by the inverter 365 and input to the /OSBRST terminal of the one-shot timer 370. When the L-level signal is input to the /OSBRST terminal of the one-shot timer 370, the output of the one-shot timer 370 is latched at L level.

When an error has arisen in the VBUS voltage, the /SUSP_LAT signal output from the /Q1 terminal of the D flip-flop 362 is latched at L level. When the /SUSP_LAT signal is latched at L level, the L-level /SUSP_LAT signal is input to the /OSARST terminal of the one-shot timer 357, and the LD_FET_OS signal output from the one-shot timer 357 is latched at L level.

The LD_FET_OS signal output from the one-shot timer 357 is input to the inverter 366, as described above. The power source control unit 303 further includes OR gates 368 and 374. The signal output from the inverter 366 is supplied to the OR gates 368 and 374.

The signal output from the OR gate 368 is supplied to a CLK2 terminal, which is a clock input terminal of the D flip-flop 367. A VB1_OK_LAT signal is output from a Q2 terminal, which is an output terminal of the D flip-flop 367. The VB1_OK_LAT signal is input to the OR gate 368 and the AND gate 371. The power source control unit 303 further includes a delay circuit 369. The VB1_OK_LAT signal is also input to the delay circuit 369.

The VB1_OK_LAT signal output from the D flip-flop 367 is output from the power source control unit 303 as the VTEST1_RES signal. The VTEST1_RES signal indicates a result of the first load test. The VTEST1_RES signal is inverted by the inverter 395, and the VTEST1_RES signal inverted by the inverter 395 is input to the VTEST1_RES_IN terminal of the CPU 304.

Because the VTEST1_RES signal is inverted by the inverter 395, an L-level signal is input to the VTEST1_RES_IN terminal of the CPU 304 when the H-level VTEST1_RES signal is output from the power source control unit 303. The CPU 304 detects that the VTEST1_RES signal is being output from the power source control unit 303 on the basis of the signal being input to the VTEST1_RES_IN terminal being at L level. Additionally, the CPU 304 can detect that the first load test carried out by the power source control unit 303 has succeeded on the basis of the signal being input to the VTEST1_RES_IN terminal being L level.

The /VB1_OK_LAT signal is output from the /Q2 terminal, which is an inverted output terminal of the D flip-flop 367. The /VB1_OK_LAT signal is input to the AND gates 355, 353, and 364.

When the power source voltage VDD is supplied to the power source line VDDIN_CIR of the power source control unit 303, the VB1_DET_DLY signal output from the delay circuit 342 is delayed by the predetermined time TdlyA, and transitions from L level to H level. Upon the VB1_DET_DLY signal transitioning from L level to H level, the potential at the D2 terminal, which is an input terminal of the D flip-flop 367, goes to H level.

Upon the LD_FET_OS signal output from the one-shot timer 357 transitioning from L level to H level, the signal input to the CLK2 terminal of the D flip-flop 367 transitions from H level to L level. Then, when the predetermined time TosA elapses, the LD_FET_OS signal transitions from H level to L level, and the signal input to the CLK2 terminal of the D flip-flop 367 transitions from L level to H level. When the signal input to the CLK2 terminal of the D flip-flop 367 transitions from L level to H level, the Q2 terminal of the D flip-flop 367 is latched at H level, and the /Q2 terminal of the D flip-flop 367 is latched at L level.

When the Q2 terminal of the D flip-flop 367 is latched at H level, the CLK2 terminal of the D flip-flop 367 is fixed at H level. Accordingly, the state of the Q2 terminal and the state of the /Q2 terminal do not change even if the LD_FET_OS signal transitions to another state while the CLK2 terminal of the D flip-flop 367 is fixed at H level.

When the first load test is carried out and then ends, the LD_FET_OS signal output from the one-shot timer 357 transitions from H level to L level. The transition of the LD_FET_OS signal from H level to L level is logically inverted and latched by the D flip-flop 367. The D flip-flop 367 does not carry out such a latch for a transition of the LD_FET_OS signal in a period outside the period of the first load test.

When the first load test is carried out and then ends, the VB1_OK_LAT signal output from the D flip-flop 367 is latched at H level, as described above. The VB1_OK_LAT signal latched at H level is supplied to the delay circuit 369.

The delay circuit 369 delays the VB1_OK_LAT signal output from the D flip-flop 367 by a predetermined time TdlyB. The signal delayed by the delay circuit 369 is supplied to the one-shot timer 370. Note that the predetermined time TdlyB is set to satisfy an amount of time required for a second load test (described later) and an amount of time required for the load test current LOAD_CURR to transition from on state to off state in response to the LD_FET_OS signal.

Upon the input signal transitioning from L level to H level, the one-shot timer 370 outputs the HW_LAT_OS signal, which is at H level only for a predetermined time TosB. During the predetermined time TosB, the one-shot timer 370 does not output the H-level HW_LAT_OS signal, even if the input signal has again transitioned from L level to H level.

The one-shot timer 370 includes the /OSBRST terminal, which is a reset input terminal. The signal output from the inverter 365 is input to the /OSBRST terminal of the one-shot timer 370. As described above, when an error has arisen in the VBUS voltage, the SUSP_LAT signal output from the Q1 terminal of the D flip-flop 362 is latched at H level. Accordingly, the signal output from the AND gate 364 goes to H level when an error has arisen in the VBUS voltage while the /VB1_OK_LAT signal output from the /Q2 terminal of the D flip-flop 367 is at H level. The signal output from the AND gate 364 is inverted by the inverter 365 and is thus L level. When the L-level signal is input to the /OSBRST terminal of the one-shot timer 370, the HW_LAT_OS signal output from the one-shot timer 370 is latched at L level.

The one-shot timer 370 outputs the L-level HW_LAT_OS signal when the /OSBRST signal is at L level. The one-shot timer 370 outputs the L-level HW_LAT_OS signal when the L-level /OSBRST signal is being supplied, even if the predetermined time TosB has not yet elapsed after the start of the output of the H-level HW_LAT_OS signal.

The HW_LAT_OS signal output from the one-shot timer 370 is input to the power source IC 312 through the OR gate 319. The power source IC 312 turns on upon the H-level signal being input to the power source IC 312. The HW_LAT_OS signal output from the one-shot timer 370 can function as an activation signal for the power source IC 312.

The above-described predetermined time TosB is set in accordance with the following standpoint. The predetermined time TosB is set to satisfy the amount of time required for the hardware and software of the CPU 304 to activate after the power source IC 312 has been turned on by the HW_LAT_OS signal.

If the hardware and software of the CPU 304 have activated normally, the CPU 304 outputs the H-level VDDEN_OUT signal before the predetermined time TosB elapses. The H-level VDDEN_OUT signal is input to the OR gate 319. Upon the H-level VDDEN_OUT signal being input to the OR gate 319, an H-level signal is supplied to the EN_D terminal of the power source IC 312 from the OR gate 319. Accordingly, a predetermined voltage output from the VOUT_D terminal of the power source IC 312 is supplied to the VDDIN_CPU terminal of the CPU 304 even if the HW_LAT_OS signal from the power source control unit 303 has transitioned from H level to L level in response to the predetermined time TosB elapsing. The electronic device 301 is kept in the active state as a result.

The following takes place if for some reason the hardware or software of the CPU 304 has not activated normally. The HW_LAT_OS signal from the power source control unit 303 transitions from H level to L level after the predetermined time TosB has elapsed. A L-level signal is supplied to the EN_D terminal of the power source IC 312 from the OR gate 319. As a result, the supply of the predetermined voltage from the VOUT_D terminal of the power source IC 312 to the VDDIN_CPU terminal of the CPU 304 is stopped. The electronic device 301 is not kept in an active state, and thus stable control is realized.

The CHG_TYPE signal output from the CHG_TYPE_OUT terminal of the battery charging IC 302 is supplied to the AND gate 371. Additionally, the /SUSP_LAT signal output from the /Q1 terminal of the D flip-flop 362 is supplied to the AND gate 371. Furthermore, the VB1_OK_LAT signal output from the Q2 terminal of the D flip-flop 367 is supplied to the AND gate 371. The signal output from the AND gate 371 is supplied to the delay circuit 372.

The delay circuit 372 delays the signal supplied from the AND gate 371 by a predetermined time TdlyC. The signal delayed by the delay circuit 372 is output from the delay circuit 372 as the VB2_DET_EN signal. The VB2_DET_EN signal is input to a D3 terminal, which is an input terminal of a D flip-flop 373. The VB2_DET_EN signal is supplied to the AND gate 375 and the gate of the N-channel MOSFET 382. Note that the predetermined time TdlyC is set to satisfy an amount of time required for the load test current LOAD_CURR to transition from on state to off state in response to the LD_FET_OS signal.

The signal output from the inverter 366 is supplied to the OR gate 374. The signal output from the OR gate 374 is input to a CLK3 terminal, which is a clock input terminal of the D flip-flop 373. A VB2_OK_LAT signal output from a Q3 terminal, which is an output terminal of the D flip-flop 373, is input to the OR gate 374. The VB2_OK_LAT signal is also input to the AND gate 376.

The VB2_OK_LAT signal and the /SUSP_LAT signal are input to the AND gate 376. The VTEST2_RES signal output from the AND gate 376 is output from the power source control unit 303. The VTEST2_RES signal indicates a result of the second load test. The VTEST2_RES signal is inverted by the inverter 396, and the VTEST2_RES signal inverted by the inverter 396 is input to the VTEST2_RES_IN terminal of the CPU 304.

Because the VTEST2_RES signal is inverted by the inverter 395, an L-level signal is input to the VTEST2_RES_IN terminal of the CPU 304 when the H-level VTEST2_RES signal is output from the power source control unit 303. The CPU 304 detects that the VTEST2_RES signal is being output from the power source control unit 303 on the basis of the signal being input to the VTEST2_RES_IN terminal being at L level. Additionally, the CPU 304 can detect that the second load test carried out by the power source control unit 303 has succeeded on the basis of the signal being input to the VTEST2_RES_IN terminal being L level.

The /VB2_OK_LAT signal is output from the /Q3 terminal, which is an inverted output terminal of the D flip-flop 373. The /VB2_OK_LAT signal is input to the AND gate 375.

The signal output from the AND gate 371 is at H level when all of the CHG_TYPE signal, the /SUSP_LAT signal, and the VB1_OK_LAT signal are H level. Upon the signal output from the AND gate 371 transitioning from L level to H level, the VB2_DET_EN signal output from the delay circuit 372 is delayed by the predetermined time TdlyC and transitions from L level to H level. Upon the VB2_DET_EN signal transitioning from L level to H level, the potential at the D3 terminal, which is an input terminal of the D flip-flop 373, goes to H level.

Upon the LD_FET_OS signal output from the one-shot timer 357 transitioning from L level to H level, the signal input to the CLK3 terminal of the D flip-flop 373 transitions from H level to L level. Then, when the predetermined time TosA elapses, the LD_FET_OS signal transitions from H level to L level, and the signal input to the CLK3 terminal of the D flip-flop 373 transitions from L level to H level. When the signal input to the CLK3 terminal of the D flip-flop 373 transitions from L level to H level, the Q3 terminal of the D flip-flop 373 is latched at H level, and the /Q3 terminal of the D flip-flop 373 is latched at L level.

When the Q3 terminal of the D flip-flop 373 is latched at H level, the CLK3 terminal of the D flip-flop 373 is fixed at H level. Accordingly, the state of the Q3 terminal and the state of the /Q3 terminal do not change even if the LD_FET_OS signal transitions thereafter.

When the second load test is carried out and then ends, the LD_FET_OS signal output from the one-shot timer 357 transitions from H level to L level. The transition of the LD_FET_OS signal from H level to L level is logically inverted and latched by the D flip-flop 373. The D flip-flop 373 does not carry out such a latch for a transition of the LD_FET_OS signal in a period outside the period of the second load test.

The VB2_DET_EN signal and the /VB2_OK_LAT signal are input to the AND gate 375. The signal output from the AND gate 375 is input to the OR gate 356. The signal output from the AND gate 355 and the signal output from the AND gate 375 are supplied to the OR gate 356.

The signal supplied to the OR gate 356 from the AND gate 355 serves as a trigger for starting the first load test. The signal supplied to the OR gate 356 from the AND gate 375 serves as a trigger for starting the second load test.

Figure 2A:
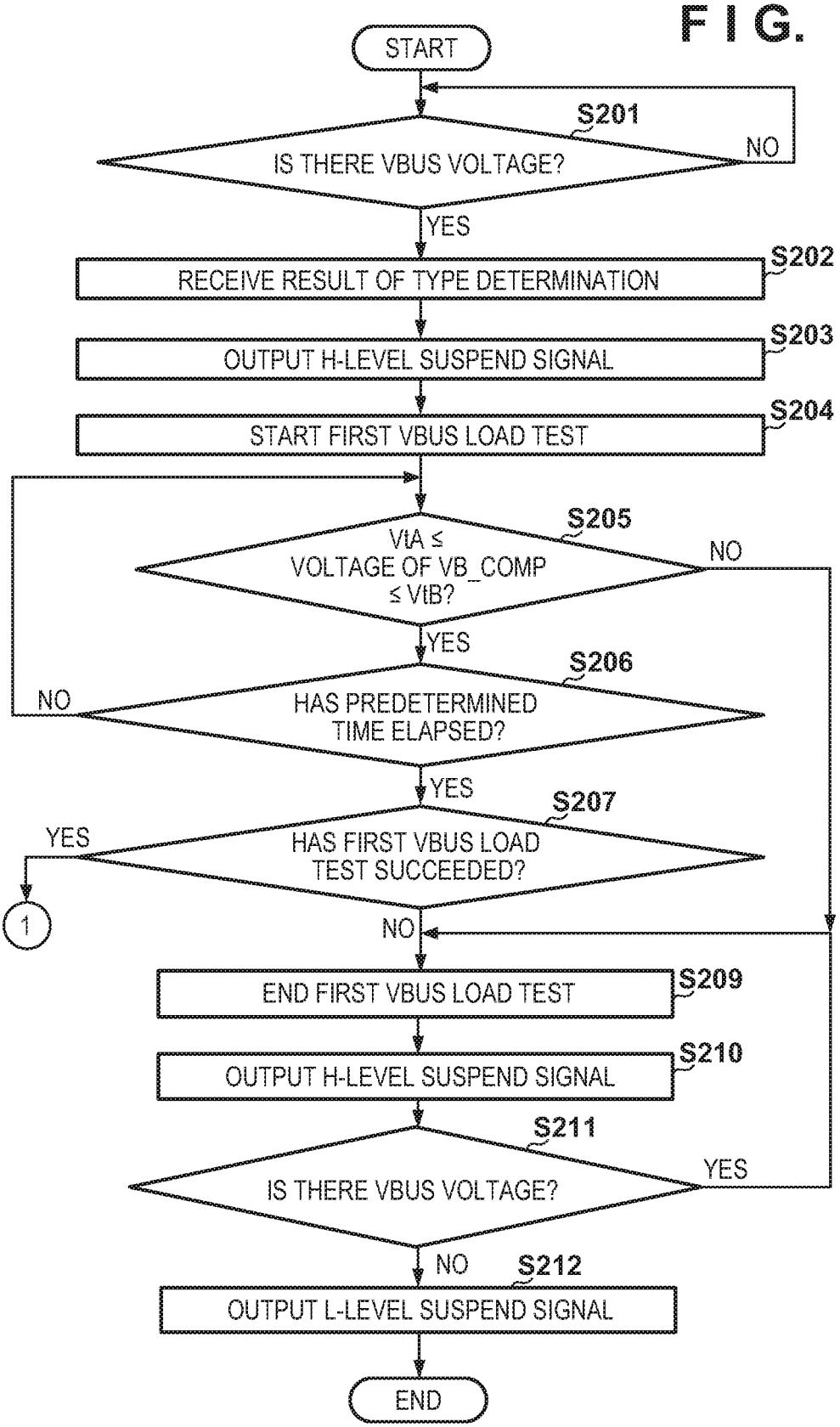
FIGS. 2A, 2B, and 2C are flowcharts illustrating an example of a method by which the electronic device 301 detects the actual power supply capability of a power supply apparatus 401.
Figure 2B:
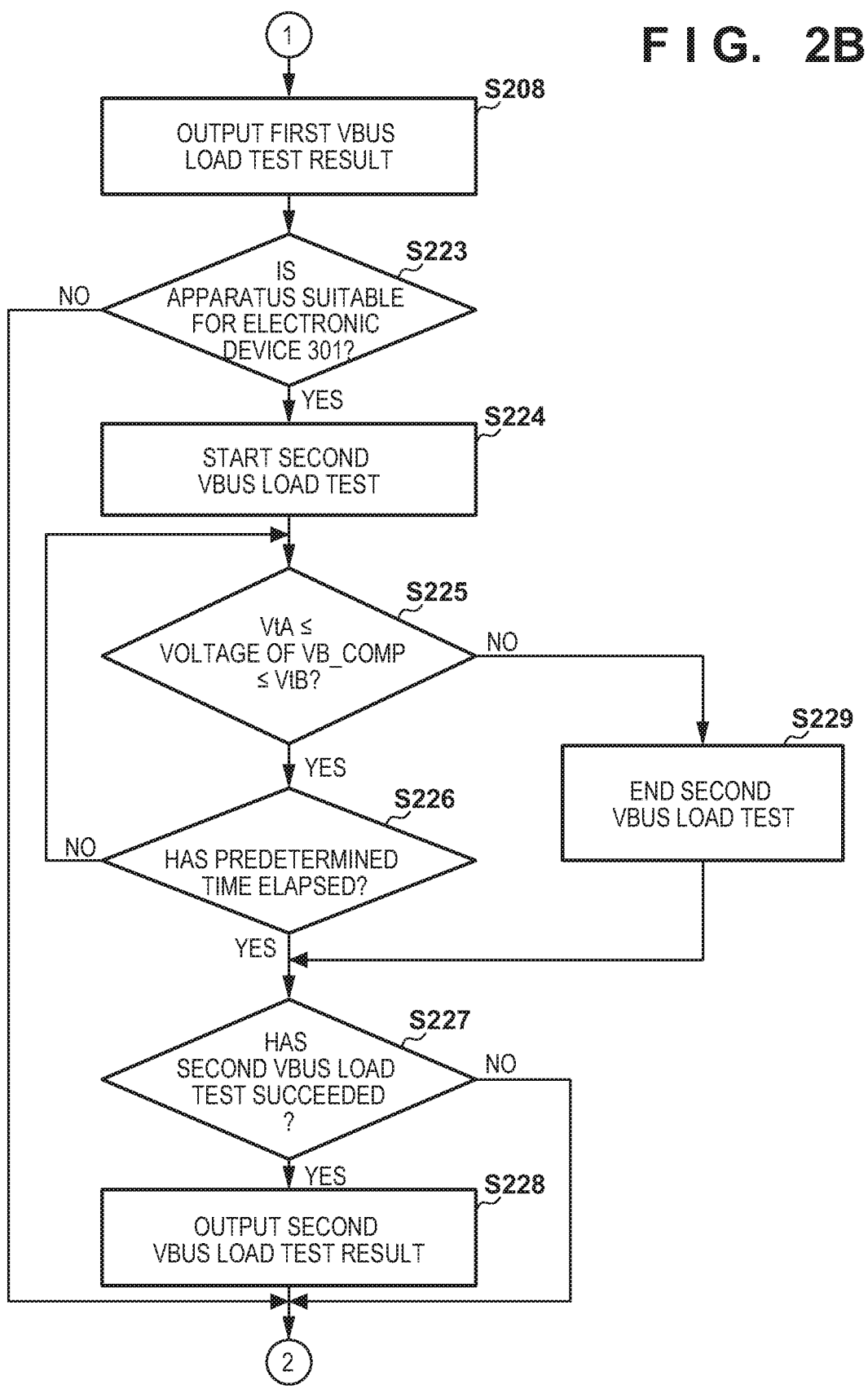
Figure 2C:
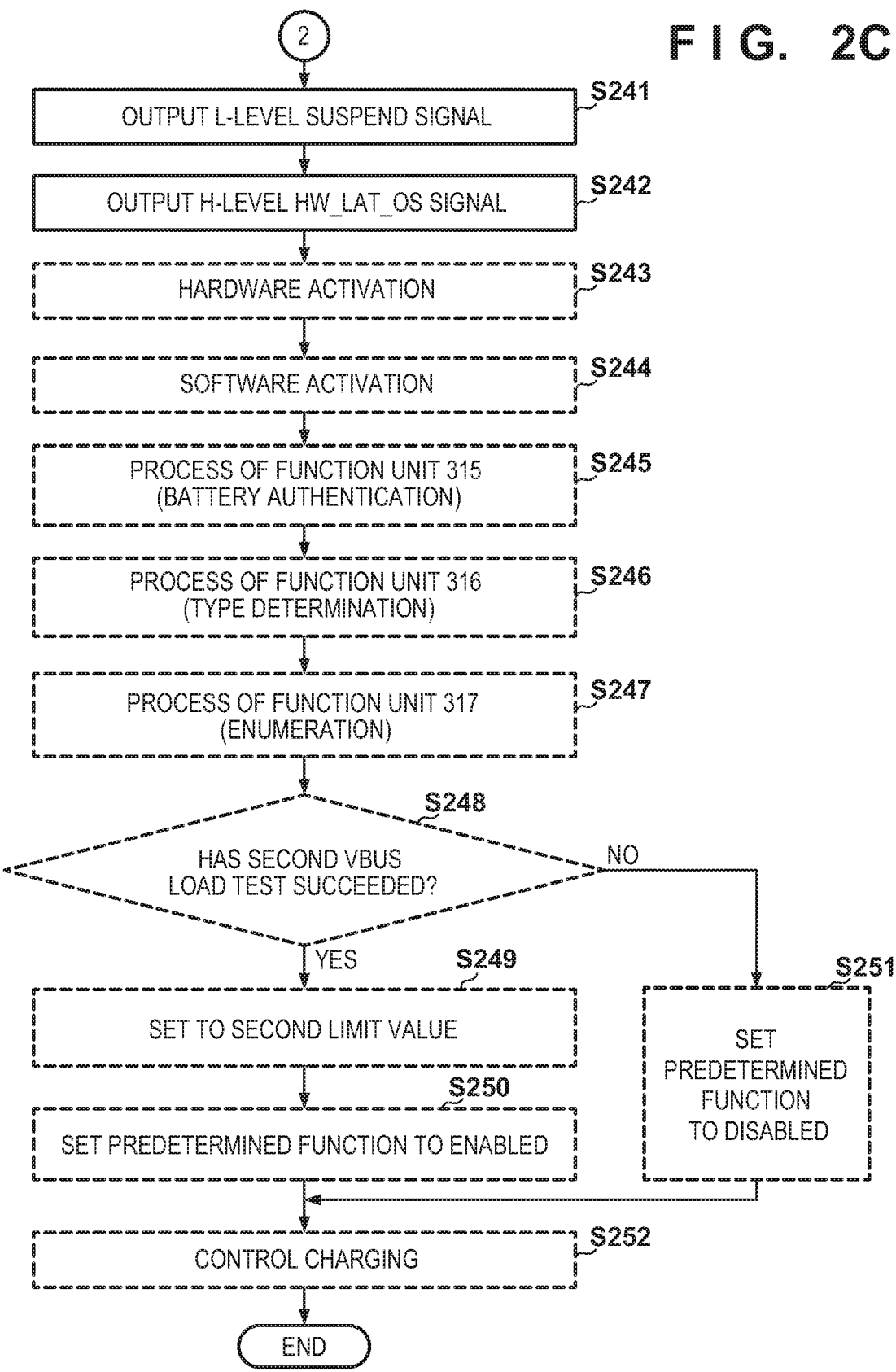

Next, an example of operations of the electronic device 301 according to the first embodiment will be described with reference to FIGS. 2A, 2B, and 2C. FIGS. 2A, 2B, and 2C are flowcharts illustrating an example of a method by which the electronic device 301 detects the actual power supply capability of the power supply apparatus 401, according to the first embodiment. In the example illustrated in FIGS. 2A, 2B, and 2C, the first load test and the second load test are carried out in a state where the battery charging IC 302, which consumes VBUS current, is set to a suspended state. Processes illustrated in FIGS. 2A, 2B, and 2C are carried out primarily by the power source control unit 303. Processes carried out by the CPU 304 are indicated by broken lines in FIGS. 2A, 2B, and 2C.

Upon the power supply apparatus 401 being connected to the electronic device 301, the VBUS voltage output from the power supply apparatus 401 is supplied to the VIN_C terminal of the power source IC 311. When the VBUS voltage is supplied from the power supply apparatus 401 to the VIN_C terminal of the power source IC 311, the power source IC 311 outputs the power source voltage, obtained by transforming the VBUS voltage supplied to the VIN_C terminal, from the VOUT_C terminal. The power source voltage output from the VOUT_C terminal of the power source IC 311 being supplied to the power source control unit 303 means that the VBUS voltage is being supplied to the power source control unit 303. In step S201, it is determined whether or not a VBUS voltage sufficient for operating the power source control unit 303 is being supplied to the power source control unit 303. If a VBUS voltage sufficient for operating the power source control unit 303 is being supplied to the power source control unit 303 (YES in step S201), step S202 is executed. However, if a VBUS voltage sufficient for operating the power source control unit 303 is not being supplied to the power source control unit 303 (NO in step S201), step S201 is repeated.

In step S202, the CHG_TYPE signal output from the CHG_TYPE_OUT terminal of the battery charging IC 302 is input to the power source control unit 303. As described above, the CHG_TYPE signal indicates the result of determining the type of the power supply apparatus 401. Note that the result of determining the type of the power supply apparatus 401 is obtained as follows. Upon the power supply apparatus 401 being connected to the electronic device 301, the VBUS voltage is supplied to the battery charging IC 302, and the battery charging IC 302 begins operating. The battery charging IC 302 determines the type of the power supply apparatus 401 and outputs the result of the type determination as the CHG_TYPE signal.

In step S203, the power source control unit 303 outputs the H-level SUSPEND signal. The SUSPEND signal output from the power source control unit 303 is input to the SUSPEND_IN_A terminal of the battery charging IC 302. The battery charging IC 302 enters a suspended state upon the H-level SUSPEND signal being input to the SUSPEND_IN_A terminal.

In step S204, the power source control unit 303 outputs the H-level LD_FET_OS signal from the one-shot timer 357 for the predetermined time TosA. The first load test is started as a result.

In step S205, the power source control unit 303 determines whether or not the voltage of the VB_COMP signal is within a range greater than or equal to VtA and less than or equal to VtB. If the voltage of the VB_COMP signal is within a range greater than or equal to VtA and less than or equal to VtB (YES in step S205), step S206 is executed. If the voltage of the VB_COMP signal is not within a range greater than or equal to VtA and less than or equal to VtB (NO in step S205), step S209 is executed.

In step S209, the power source control unit 303 ends the first load test. In step S209, the first load test is ended even if the predetermined time TosA has not yet elapsed following the start of the output of the H-level LD_FET_OS signal.

In step S210, the power source control unit 303 outputs the H-level SUSPEND signal. The battery charging IC 302 enters a suspended state as a result. Note that if the SUSPEND signal output in step S203 is being kept at H level, the SUSPEND signal is also kept at H level in step S210.

In step S211, it is determined whether or not a VBUS voltage sufficient for operating the power source control unit 303 is being supplied to the power source control unit 303. If a VBUS voltage sufficient for operating the power source control unit 303 is being supplied to the power source control unit 303 (YES in step S211), step S209 is executed. However, if a VBUS voltage sufficient for operating the power source control unit 303 is not being supplied to the power source control unit 303 (NO in step S211), step S212 is executed.

In step S212, the power source control unit 303 outputs the L-level SUSPEND signal. The battery charging IC 302 exits the suspended state as a result. In this case, the processes illustrated in FIGS. 2A, 2B, and 2C end.

In step S206, it is determined whether or not the predetermined time TosA has elapsed following the start of the output of the H-level LD_FET_OS signal. If the predetermined time TosA has elapsed following the start of the output of the H-level LD_FET_OS signal (YES in step S206), the LD_FET_OS signal goes to L level and step S207 is executed. However, if the predetermined time TosA has not elapsed following the start of the output of the H-level LD_FET_OS signal (NO in step S206), the LD_FET_OS signal remains at H level and step S205 is executed.

In step S207, the power source control unit 303 determines whether or not the first load test has succeeded. If the first load test has succeeded (YES in step S207), the H-level VB1_OK_LAT signal is output from the Q2 terminal of the D flip-flop 367, and step S208 is executed. If the first load test has not succeeded (NO in step S207), the L-level VB1_OK_LAT signal is output from the Q2 terminal of the D flip-flop 367, and step S209 is executed.

In step S208, the power source control unit 303 outputs the H-level VTEST1_RES signal, indicating that the first load test has succeeded. After the predetermined time TdlyB has elapsed following the H-level VTEST1_RES signal being output, the H-level HW_LAT_OS signal is output from the one-shot timer 370. Note that the predetermined time TdlyB is produced by the delay circuit 369. The predetermined time TdlyB is an amount of time sufficient for executing step S208 through step S241 (described later).

In step S223, the power source control unit 303 determines whether or not the power supply apparatus 401 connected to the electronic device 301 is an apparatus suitable for the electronic device 301, on the basis of the CHG_TYPE signal. In the first embodiment, if the power supply apparatus 401 is compliant with the USB BC or USB Type-C standard, for example, the power supply apparatus 401 is determined to be an apparatus suitable for the electronic device 301. If the power supply apparatus 401 is an apparatus suitable for the electronic device 301 (YES in step S223), step S224 is executed. However, if the power supply apparatus 401 is not an apparatus suitable for the electronic device 301 (NO in step S223), step S241 is executed.

In step S224, the power source control unit 303 outputs the H-level LD_FET_OS signal from the one-shot timer 357 for the predetermined time TosA. The second load test is started as a result.

In step S225, the power source control unit 303 determines whether or not the voltage of the VB_COMP signal is within a range greater than or equal to VtA and less than or equal to VtB. If the voltage of the VB_COMP signal is within a range greater than or equal to VtA and less than or equal to VtB (YES in step S225), step S226 is executed. If the voltage of the VB_COMP signal is not within a range greater than or equal to VtA and less than or equal to VtB (NO in step S225), step S229 is executed.

In step S229, the power source control unit 303 ends the second load test. In step S229, the second load test is ended even if the predetermined time TosA has not yet elapsed following the start of the output of the H-level LD_FET_OS signal.

In step S226, it is determined whether or not the predetermined time TosA has elapsed following the start of the output of the H-level LD_FET_OS signal. If the predetermined time TosA has elapsed following the start of the output of the H-level LD_FET_OS signal (YES in step S226), the LD_FET_OS signal goes to L level and step S227 is executed. However, if the predetermined time TosA has not elapsed following the start of the output of the H-level LD_FET_OS signal (NO in step S226), the LD_FET_OS signal remains at H level and step S225 is executed.

In step S227, the power source control unit 303 determines whether or not the second load test has succeeded. If the second load test has succeeded (YES in step S227), the H-level VB2_OK_LAT signal is output from the Q3 terminal of the D flip-flop 373, and step S228 is executed. If the second load test has not succeeded (NO in step S227), the L-level VB2_OK_LAT signal is output from the Q3 terminal of the D flip-flop 373, and step S241 is executed.

In step S228, the power source control unit 303 outputs the H-level VTEST2_RES signal, indicating that the second load test has succeeded. Step S241 is then executed.

In step S241, the power source control unit 303 outputs the L-level SUSPEND signal. The battery charging IC 302 exits the suspended state as a result. Step S242 is then executed.

In step S242, the power source control unit 303 outputs the H-level HW_LAT_OS signal. As a result, the power source IC 312 turns on and the CPU 304 activates. The HW_LAT_OS signal transitions to L level after the predetermined time TosB has elapsed following the output of the H-level HW_LAT_OS signal.

In step S243, the CPU 304 activates its hardware.

In step S244, the CPU 304 activates its software.

In step S245, the CPU 304 carries out a process relating to the function unit 315 (a process of authenticating the battery 320).

In step S246, the CPU 304 carries out a process relating to the function unit 316 (a process of determining the type of the power supply apparatus 401).

In step S247, the CPU 304 carries out a process relating to the power supply apparatus 401 (an enumeration process carried out between the power supply apparatus 401 and the electronic device 301).

Note that the order of executing step S245 through step S247 may be change to a different order from that described above.

In step S248, the CPU 304 determines whether or not the second load test has succeeded. The CPU 304 determines that the second load test has succeeded when the signal input to the VTEST2_RES_IN terminal is at H level. The CPU 304 determines that the second load test has not succeeded when the signal input to the VTEST2_RES_IN terminal is at L level. If it is determined that the second load test has succeeded (YES in step S248), step S249 is executed. However, if it is determined that the second load test has not succeeded (NO in step S248), step S251 is executed.

In step S251, the CPU 304 disables a predetermined function. The predetermined function disabled in step S251 is, for example, a function of causing the function unit 315, the function unit 316, and the function unit 317 to operate, and causing the battery charging IC 302 to charge the battery 320. Step S252 is then executed.

In step S249, the CPU 304 communicates with the battery charging IC 302 using the bus line, and sets a limit value of the current received by the battery charging IC 302 over the VBUS line to a second limit value. Until the second limit value is set in step S249, the limit value of the current received by the battery charging IC 302 over the VBUS line is a first limit value. In the first embodiment, the first limit value is 0.5 A and the second limit value is 1.5 A.

In step S250, the CPU 304 enables a predetermined function. The predetermined function enabled in step S250 is, for example, a function of causing the function unit 315, the function unit 316, and the function unit 317 to operate, and causing the battery charging IC 302 to charge the battery 320. Step S252 is then executed.

In step S252, the CPU 304 carries out control for charging the battery 320. The processes illustrated in FIGS. 2A, 2B, and 2C thus ends. Note that the process carried out in step S252 is not limited to the process described above. For example, in step S252, at least one of the function units 315 to 317 may be further caused to operate.

Next, an example of operations of the electronic device 301 according to the first embodiment will be described with reference to FIGS. 3A to 3C.

Figure 3A:
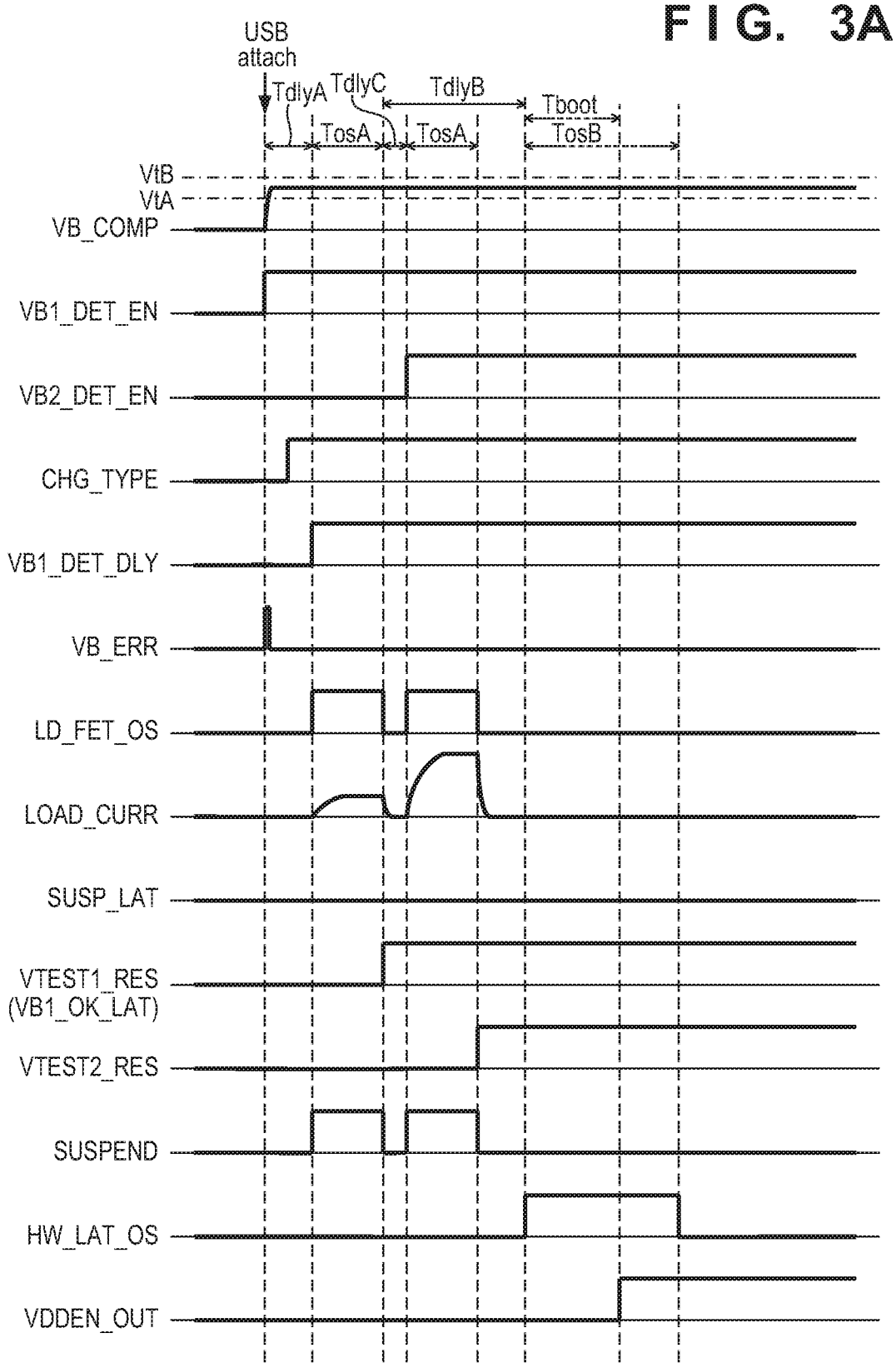
FIG. 3A is a timing chart illustrating an example of operations of the electronic device 301 according to the first embodiment.

FIG. 3A is a timing chart illustrating an example of operations of the electronic device 301 when both the first load test and the second load test succeed.

When, at a timing "USB attach", the VBUS voltage is supplied to the USB connector 390, the VB1_DET_EN signal transitions from L level to H level. The voltage of the VB_COMP signal stabilizes after a delay equivalent to the on time of the P-channel MOSFET 334.

When the voltage of the VB_COMP signal is lower than the reference voltage VtA, the VB_CP_OUTA signal goes to H level and the VB_ERR signal goes to H level, but the SUSPEND signal is at L level until the predetermined time TdlyA has elapsed. In other words, the SUSPEND signal is masked from the timing "USB attach" to when the predetermined time TdlyA has elapsed.

The H-level CHG_TYPE signal, which indicates a result of the type determination for the power supply apparatus 401, is supplied from the battery charging IC 302 to the power source control unit 303 during the period from the timing "USB attach" to when the predetermined time TdlyA has elapsed.

After the predetermined time TdlyA has elapsed following the timing "USB attach", the VB1_DET_DLY signal transitions from L level to H level. The LD_FET_OS signal is at H level during the predetermined time TosA. The SUSPEND signal is at H level while the LD_FET_OS signal is at H level.

After the LD_FET_OS signal transitions from L level to H level, the gate voltage of the N-channel MOSFET 337 rises gradually, and the load test current LOAD_CURR also rises gradually. Here, the VB1_DET_EN signal is at H level and the VB2_DET_EN signal is at L level, and thus the P-channel MOSFET 334 is on and the P-channel MOSFET 384 is off. Accordingly, the load test current LOAD_CURR is set to 0.5 A, for example.

After the predetermined time TosA has elapsed, the LD_FET_OS signal transitions from H level to L level, and the SUSPEND signal transitions from H level to L level.

After the LD_FET_OS signal transitions from H level to L level, the gate voltage of the N-channel MOSFET 337 drops quickly, and the load test current LOAD_CURR also drops quickly. After the LD_FET_OS signal transitions from H level to L level, the VTEST1_RES signal, i.e., the VB1_OK_LAT signal, is latched at H level.

After the predetermined time TdlyC has elapsed following the transition of the VTEST1_RES signal, i.e., the VB1_OK_LAT signal, from L level to H level, the VB2_DET_EN signal transitions from L level to H level. The LD_FET_OS signal is at H level during the predetermined time TosA. The SUSPEND signal is at H level while the LD_FET_OS signal is at H level.

After the LD_FET_OS signal transitions from L level to H level, the gate voltage of the N-channel MOSFET 337 rises gradually, and the load test current LOAD_CURR also rises gradually. Here, the VB1_DET_EN signal is at H level and the VB2_DET_EN signal is at H level, and thus the P-channel MOSFET 334 is on and the P-channel MOSFET 384 is on. Accordingly, the load test current LOAD_CURR is set to 1.5 A, for example.

After the predetermined time TosA has elapsed, the LD_FET_OS signal transitions from H level to L level, and the SUSPEND signal transitions from H level to L level.

After the LD_FET_OS signal transitions from H level to L level, the gate voltage of the N-channel MOSFET 337 drops quickly, and the load test current LOAD_CURR also drops quickly. After the LD_FET_OS signal transitions from H level to L level, the VTEST2_RES signal is latched at H level.

After the predetermined time TdlyB has elapsed following the transition of the VTEST1_RES signal, i.e., the VB1_OK_LAT signal, from L level to H level, the H-level HW_LAT_OS signal is output for the predetermined time TosB.

The CPU 304 activates its hardware and software during the predetermined time TosB, when the H-level HW_LAT_OS signal is being output. The activation of the hardware and the software require a time Tboot. After the activation of the hardware and the software is complete, the CPU 304 outputs the H-level VDDEN_OUT signal from the VDDEN_OUT terminal. After the predetermined time TosB has elapsed, the HW_LAT_OS signal transitions from H level to L level.

Figure 3B:
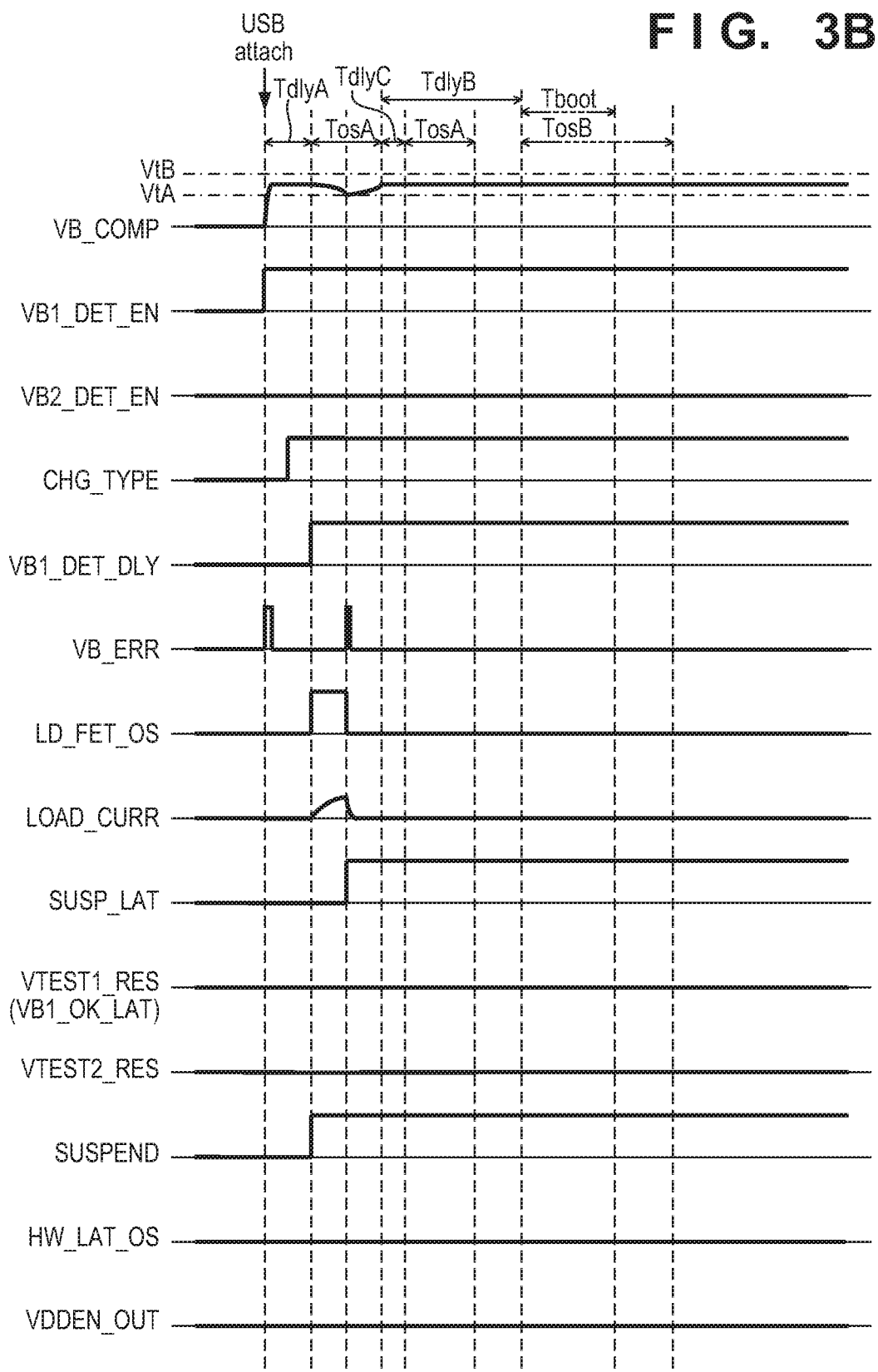
FIG. 3B is a timing chart illustrating an example of operations of the electronic device 301 according to the first embodiment.

FIG. 3B is a timing chart illustrating an example of operations of the electronic device 301 when the first load test does not succeed.

When, at the timing "USB attach", the VBUS voltage is supplied to the USB connector 390, the VB1_DET_EN signal transitions from L level to H level. The voltage of the VB_COMP signal stabilizes after a delay equivalent to the on time of the P-channel MOSFET 334.

When the voltage of the VB_COMP signal is lower than the reference voltage VtA, the VB_CP_OUTA signal goes to H level and the VB_ERR signal goes to H level, but the SUSPEND signal is at L level until the predetermined time TdlyA has elapsed. In other words, the SUSPEND signal is masked from the timing "USB attach" to when the predetermined time TdlyA has elapsed.

The H-level CHG_TYPE signal, which indicates a result of the type determination for the power supply apparatus 401, is supplied from the battery charging IC 302 to the power source control unit 303 during the period from the timing "USB attach" to when the predetermined time TdlyA has elapsed.

After the predetermined time TdlyA has elapsed following the timing "USB attach", the VB1_DET_DLY signal transitions from L level to H level. The LD_FET_OS signal then goes to H level. The SUSPEND signal is at H level while the LD_FET_OS signal is at H level.

After the LD_FET_OS signal transitions from L level to H level, the gate voltage of the N-channel MOSFET 337 rises gradually, and the load test current LOAD_CURR also rises gradually. Here, the VB1_DET_EN signal is at H level and the VB2_DET_EN signal is at L level, and thus the P-channel MOSFET 334 is on and the P-channel MOSFET 384 is off. Accordingly, the load test current LOAD_CURR is set to 0.5 A, for example.

Before the predetermined time TosA elapses, the VBUS voltage drops, the voltage of the VB_COMP signal falls below the reference voltage VtA, and the VB_CP_OUTA signal output from the comparator 343 goes to H level. Then, the VB_ERR signal output from the OR gate 349 transitions from L level to H level, and the SUSP_LAT signal output from the Q1 terminal of the D flip-flop 362 is latched at H level. The LD_FET_OS signal then transitions from H level to L level, and the SUSPEND signal is kept at H level. After the LD_FET_OS signal transitions from H level to L level, the gate voltage of the N-channel MOSFET 337 drops quickly, and the load test current LOAD_CURR also drops quickly.

The HW_LAT_OS signal is kept at L level, and the CPU 304 does not activate its hardware and software. The VTEST1_RES signal, i.e., the VB1_OK_LAT signal, is kept at L level, and the VTEST2_RES signal is also kept at L level.

Figure 3C:
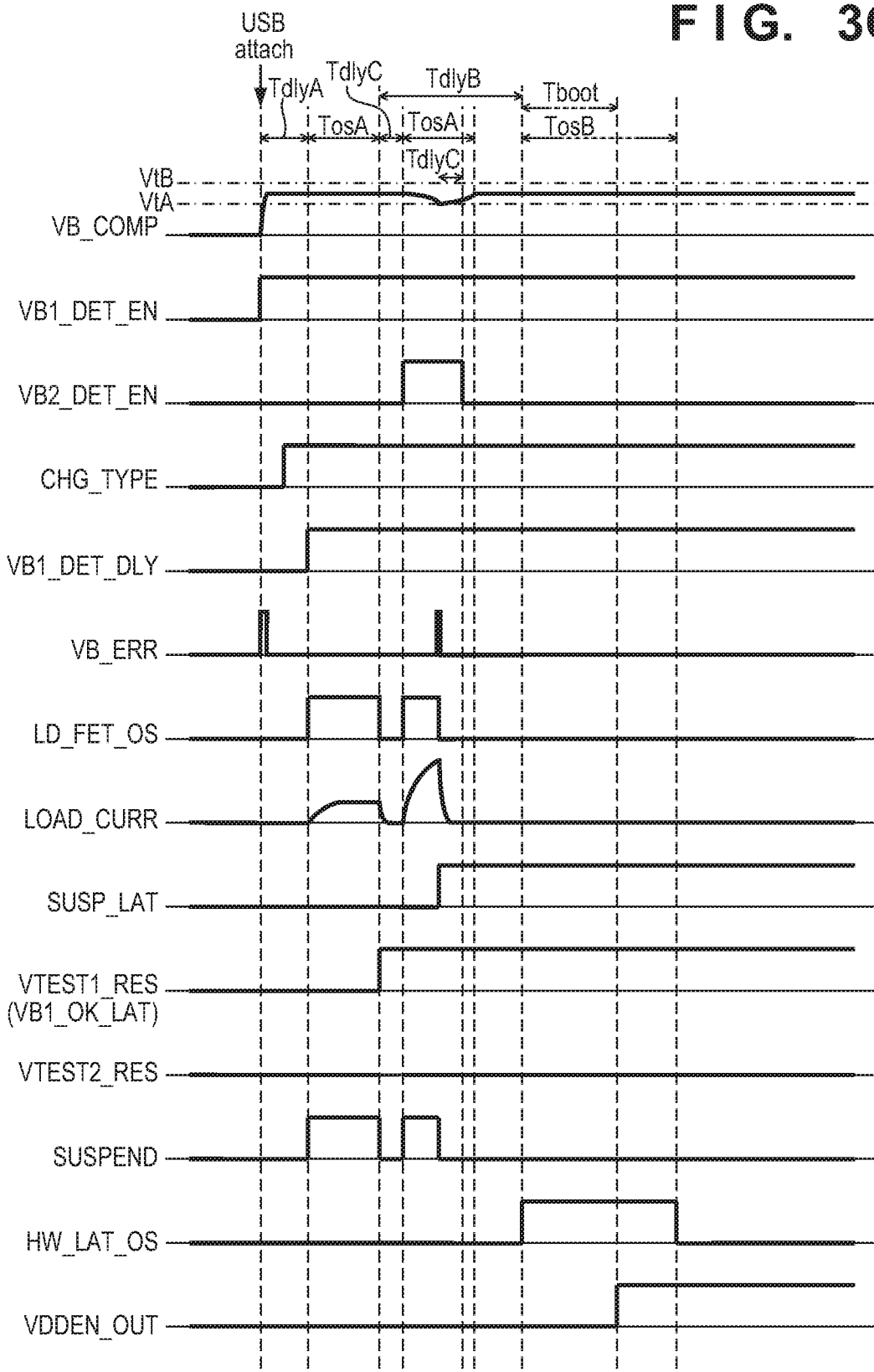
FIG. 3C is a timing chart illustrating an example of operations of the electronic device 301 according to the first embodiment.

FIG. 3C is a timing chart illustrating an example of operations of the electronic device 301 when the first load test succeeds but the second load test does not succeed.

When, at the timing "USB attach", the VBUS voltage is supplied to the USB connector 390, the VB1_DET_EN signal transitions from L level to H level. The voltage of the VB_COMP signal stabilizes after a delay equivalent to the on time of the P-channel MOSFET 334.

When the voltage of the VB_COMP signal is lower than the reference voltage VtA, the VB_CP_OUTA signal goes to H level and the VB_ERR signal goes to H level, but the SUSPEND signal is at L level until the predetermined time TdlyA has elapsed. In other words, the SUSPEND signal is masked from the timing "USB attach" to when the predetermined time TdlyA has elapsed.

The H-level CHG_TYPE signal, which indicates a result of the type determination for the power supply apparatus 401, is supplied from the battery charging IC 302 to the power source control unit 303 during the period from the timing "USB attach" to when the predetermined time TdlyA has elapsed.

After the predetermined time TdlyA has elapsed following the timing "USB attach", the VB1_DET_DLY signal transitions from L level to H level. The LD_FET_OS signal is at H level during the predetermined time TosA. The SUSPEND signal is at H level while the LD_FET_OS signal is at H level.

After the LD_FET_OS signal transitions from L level to H level, the gate voltage of the N-channel MOSFET 337 rises gradually, and the load test current LOAD_CURR also rises gradually. Here, the VB1_DET_EN signal is at H level and the VB2_DET_EN signal is at L level, and thus the P-channel MOSFET 334 is on and the P-channel MOSFET 384 is off. Accordingly, the load test current LOAD_CURR is set to 0.5 A, for example.

After the predetermined time TosA has elapsed, the LD_FET_OS signal transitions from H level to L level, and the SUSPEND signal transitions from H level to L level.

After the LD_FET_OS signal transitions from H level to L level, the gate voltage of the N-channel MOSFET 337 drops quickly, and the load test current LOAD_CURR also drops quickly. After the LD_FET_OS signal transitions from H level to L level, the VTEST1_RES signal, i.e., the VB1_OK_LAT signal, is latched at H level.

After the predetermined time TdlyC has elapsed following the transition of the VTEST1_RES signal, i.e., the VB1_OK_LAT signal, from L level to H level, the VB2_DET_EN signal transitions from L level to H level. The LD_FET_OS signal is at H level during the predetermined time TosA. The SUSPEND signal is at H level while the LD_FET_OS signal is at H level.

After the LD_FET_OS signal transitions from L level to H level, the gate voltage of the N-channel MOSFET 337 rises gradually, and the load test current LOAD_CURR also rises gradually. Here, the VB1_DET_EN signal is at H level and the VB2_DET_EN signal is at H level, and thus the P-channel MOSFET 334 is on and the P-channel MOSFET 384 is on. Accordingly, the load test current LOAD_CURR is set to 1.5 A, for example.

Before the predetermined time TosA elapses, the VBUS voltage drops, the voltage of the VB_COMP signal falls below the reference voltage VtA, and the VB_CP_OUTA signal output from the comparator 343 goes to H level. Then, the VB_ERR signal output from the OR gate 349 transitions from L level to H level, and the SUSP_LAT signal output from the Q1 terminal of the D flip-flop 362 is latched at H level. Then, the LD_FET_OS signal and the SUSPEND signal go to L level, and the VTEST2_RES signal is latched at L level.

After the LD_FET_OS signal transitions from H level to L level, the gate voltage of the N-channel MOSFET 337 drops quickly, and the load test current LOAD_CURR also drops quickly.

After the predetermined time TdlyB has elapsed following the transition of the VTEST1_RES signal, i.e., the VB1_OK_LAT signal, from L level to H level, the H-level HW_LAT_OS signal is output for the predetermined time TosB.

The CPU 304 activates its hardware and software during the predetermined time TosB, when the H-level HW_LAT_OS signal is being output. The activation of the hardware and the software require a time Tboot. After the activation of the hardware and the software is complete, the CPU 304 outputs the H-level VDDEN_OUT signal from the VDDEN_OUT terminal. After the predetermined time TosB has elapsed, the HW_LAT_OS signal transitions from H level to L level.

In this manner, according to the first embodiment, a test for detecting the actual power supply capability of the power supply apparatus 401 can be carried out in a state where the battery charging IC 302 has limited the power received from the power supply apparatus 401. Thus according to the first embodiment, the actual power supply capability of the power supply apparatus 401 can be detected by carrying out such a test.

Additionally, according to the first embodiment, multiple load tests having different load current magnitudes can be carried out. As such, the actual power supply capability of the power supply apparatus 401 can be detected even if the VBUS current is defined as a broad range, i.e. from 0.5 to 1.5 A, as is the case with USB BC, for example.

Note that embodiments of the disclosure are not limited to the first embodiment described above. Changes or revisions made to the first embodiment within a scope of the disclosure are included in embodiments of the disclosure.

For example, although the first embodiment describes a case where information is transmitted between the battery charging IC 302 and the power source control unit 303 using a plurality of signal lines as an example, the configuration is not limited thereto. For example, the information may be transmitted between the battery charging IC 302 and the power source control unit 303 through serial transfer. In this case, a two-line type, three-line type, or other serial communication standard can be used, for example.

For example, although the first embodiment describes a case where the battery charging IC 302 and the power source control unit 303 are provided as independent entities as an example, the configuration is not limited thereto. For example, the battery charging IC 302 and the power source control unit 303 may be configured as an integrated entity.

Second Embodiment

An electronic device 601 according to a second embodiment will be described next with reference to FIGS. 4A to 6C. Of components included in the electronic device 601 according to the second embodiment, components that are the same as the components included in the electronic device 301 according to the first embodiment will be given the same reference signs, and descriptions thereof will be omitted.

The electronic device 601 according to the second embodiment carries out the first load test in a state where a battery charging IC 602 or the like, which consume the VBUS current, are set to a suspended state, and carries out the second load test in a state where the battery charging IC 602 is set to not charge the battery 320.

Figure 4B:
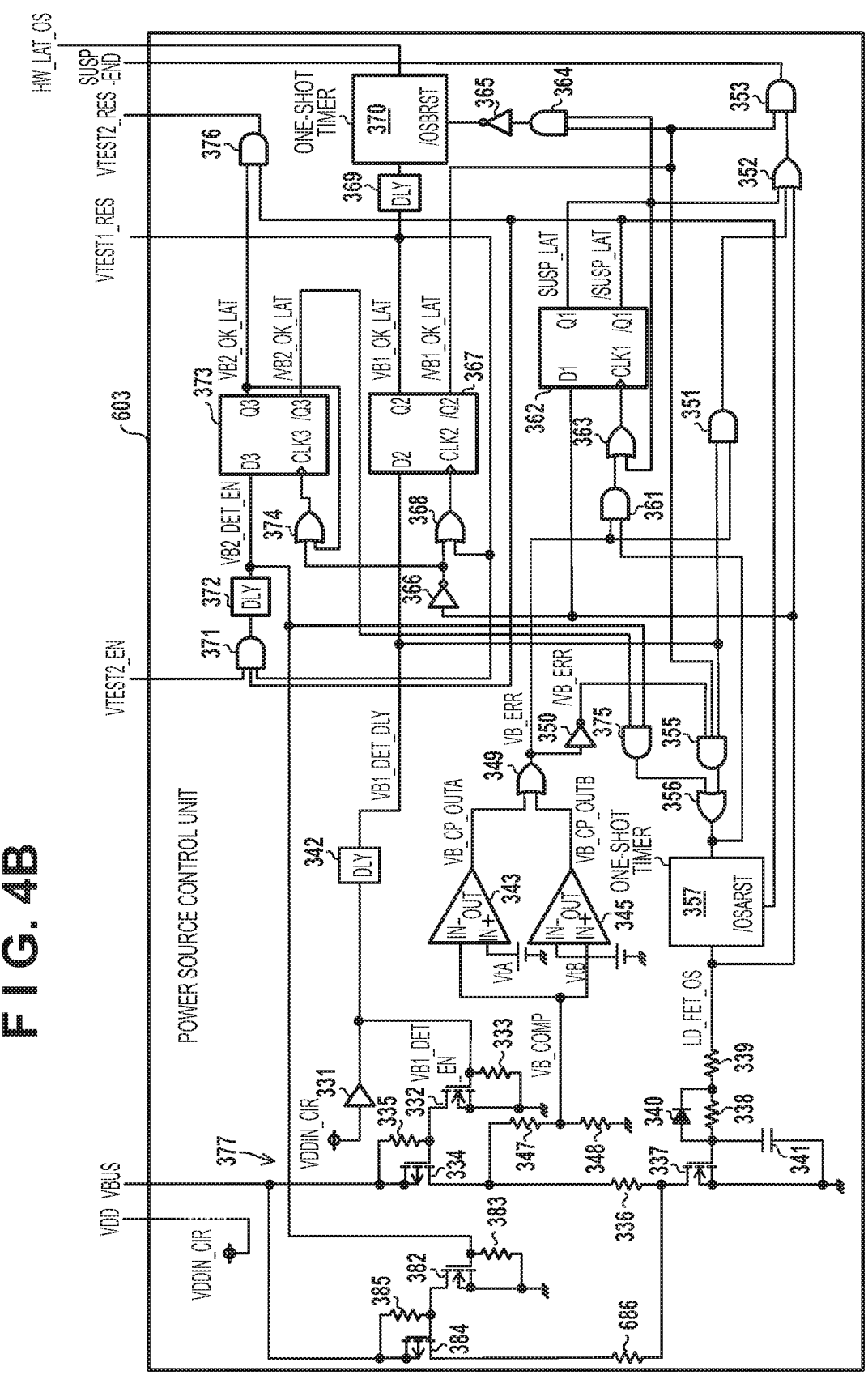
Figure 5A:
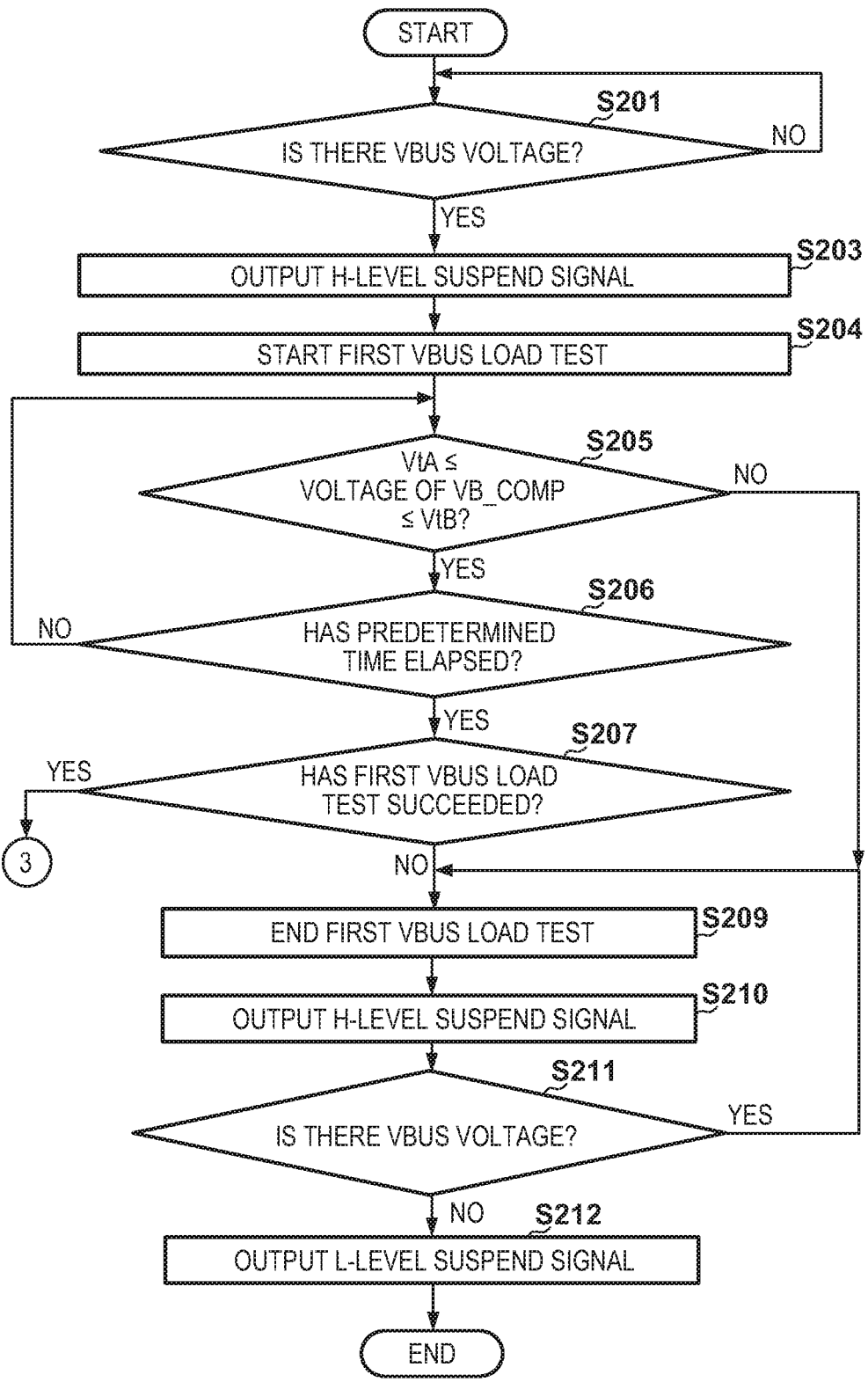
FIGS. 5A, 5B, 5C, and 5D are flowcharts illustrating an example of a method by which the electronic device 601 detects the actual power supply capability of the power supply apparatus 401.
Figure 5B:
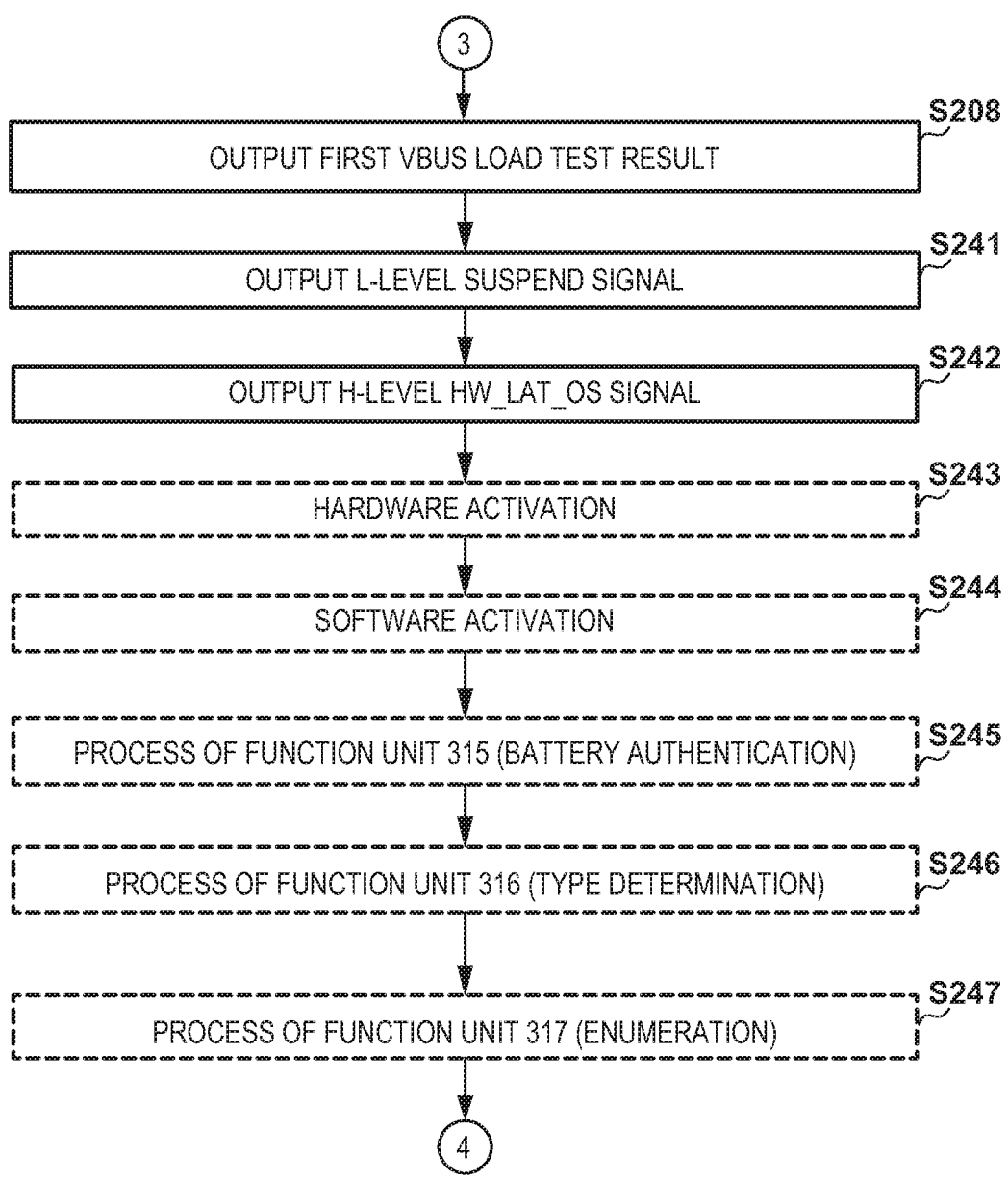
Figure 5C:
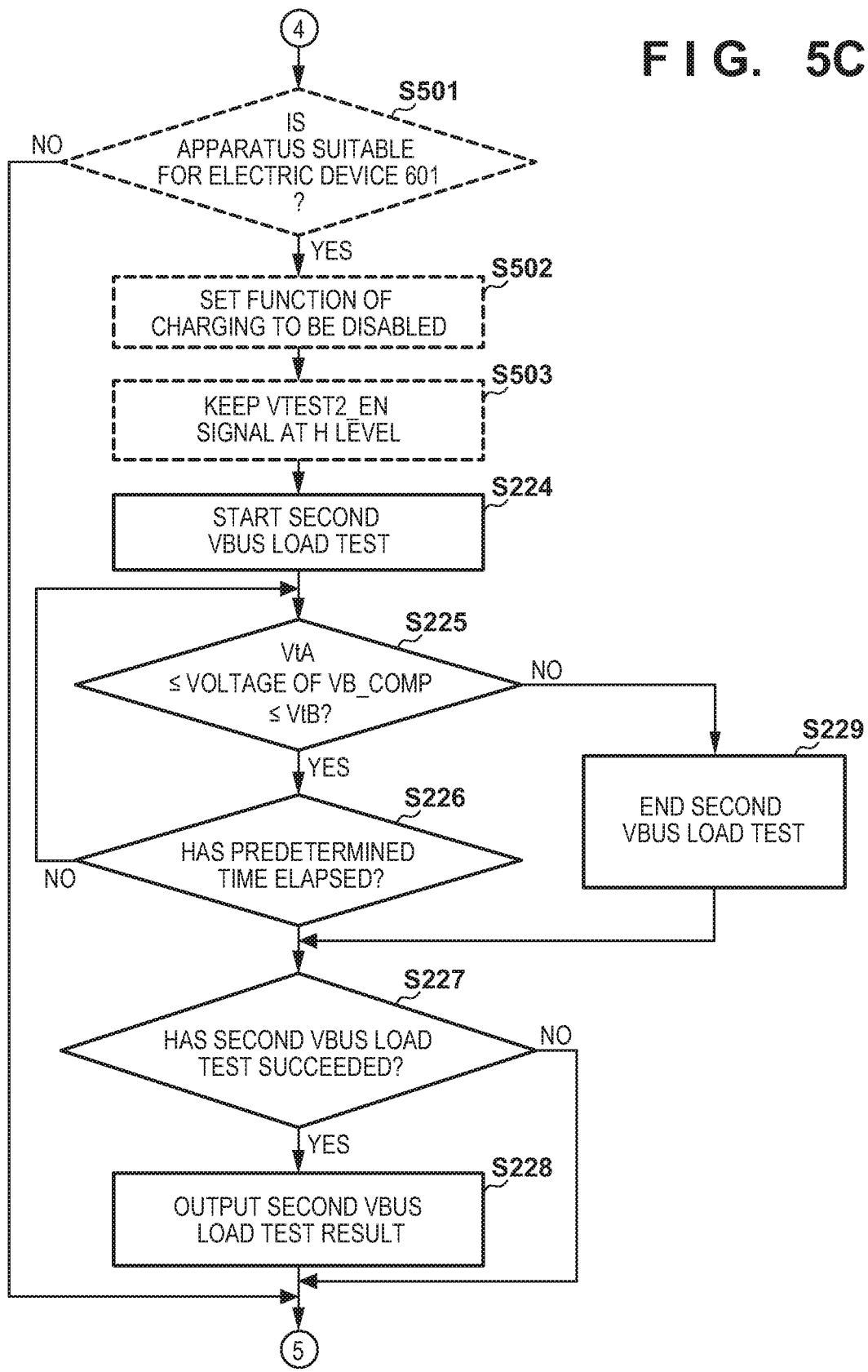
Figure 5D:
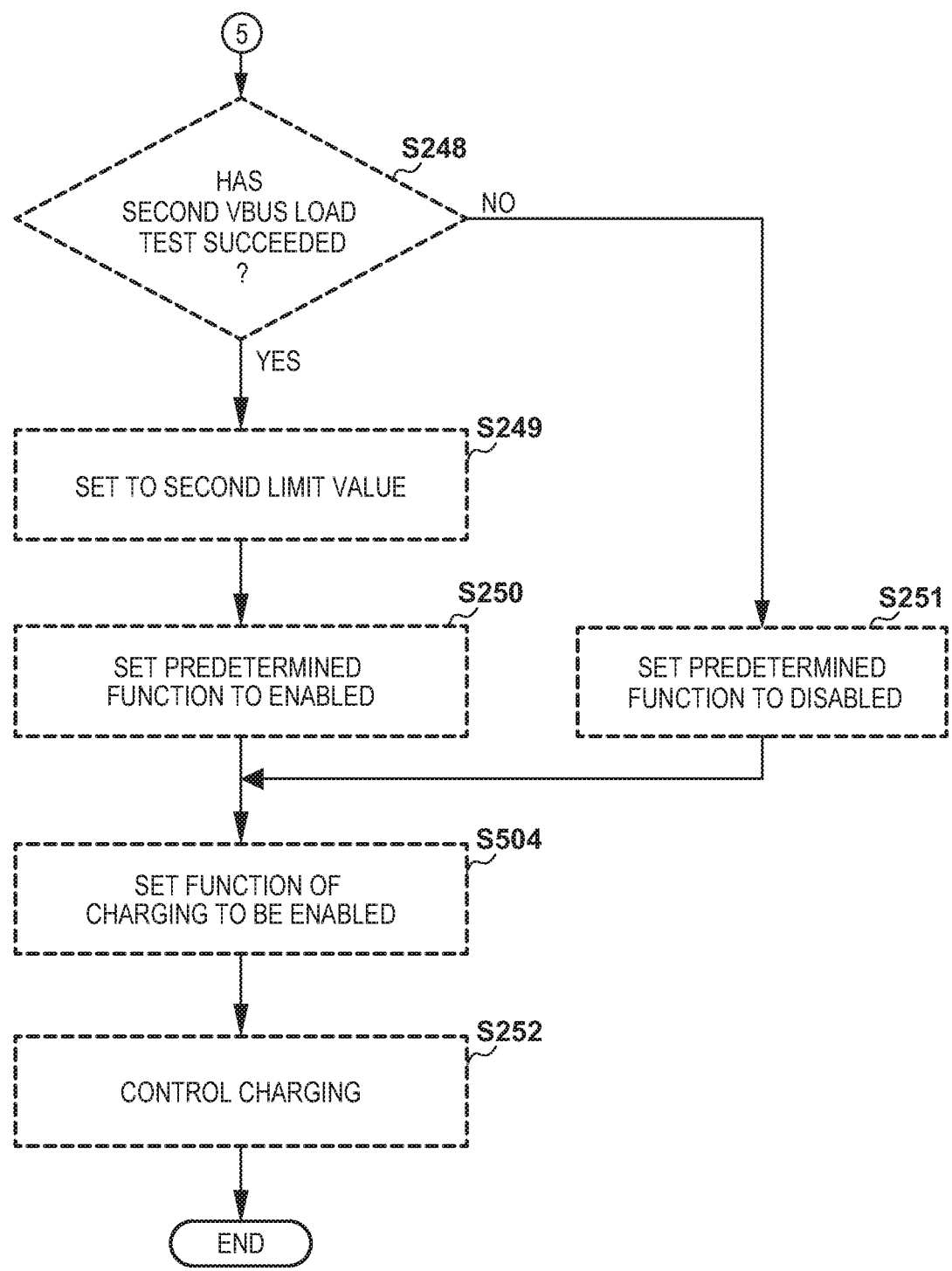

FIGS. 4A and 4B are block diagrams illustrating one example of components of the electronic device 601 according to the second embodiment. As illustrated in FIGS. 4A and 4B, the electronic device 601 according to the second embodiment includes a power source control unit 603. The power source control unit 603 according to the second embodiment differs from the power source control unit 303 described with reference to FIGS. 1A and 1B in the following ways.

With the power source control unit 303 according to the first embodiment, the CHG_TYPE signal is supplied to the AND gate 371. However, with the power source control unit 603 according to the second embodiment, a VTEST2_EN signal (described later) is supplied.

With the power source control unit 303 according to the first embodiment, the OR gate 354 is provided. However, with the power source control unit 603 according to the second embodiment, the OR gate 354 is not provided. In the second embodiment, a three-input OR gate is used as the OR gate 352. The signal output from the AND gate 351, the SUSP_LAT signal output from the Q1 terminal of the D flip-flop 362, and the LD_FET_OS signal output from the one-shot timer 357 are input to the OR gate 352. In the second embodiment, the signal output from the AND gate 353 is output to the power source control unit 303 as a SUSPEND signal.

The power source control unit 303 according to the first embodiment includes the resistor 386. In contrast to the first embodiment, the power source control unit 603 according to the second embodiment includes a resistor 686, which has a different resistance value from the resistor 386.

In the second embodiment, when the VB1_DET_EN signal is at H level and the VB2_DET_EN signal is at H level, the load test current LOAD_CURR is set as follows. That is, in the second embodiment, the load test current LOAD_CURR is set as follows when the P-channel MOSFET 334 is on and the P-channel MOSFET 384 is on. In such a case, the settings are made so that the magnitude of the load test current LOAD_CURR is 1 A, for example, and the time for which the load test current LOAD_CURR flows is 2 ms, for example.

Upon transitioning from a state where the power source voltage is not being supplied to the power source control unit 603 to a state where the power source voltage is supplied to the power source control unit 603, the power source control unit 603 behaves as follows. The logic of the circuits in the power source control unit 603 is reset to a default state, and the functions of the circuits in the power source control unit 603 are negated. On the other hand, upon transitioning from a state where the power source voltage is being supplied to the power source control unit 603 to a state where the power source voltage is not supplied to the power source control unit 603, the functions of the circuits of the power source control unit 603 are negated.

The battery charging IC 602 includes a /CHG_EN terminal. The battery charging IC 602 does not include the CHG_TYPE_OUT terminal of the battery charging IC 302, described with reference to FIG. 1A. The battery charging IC 602 disables a function of charging the battery 320 when the VTEST2_EN signal input to the /CHG_EN terminal is at H level. The battery charging IC 602 enables the function of charging the battery 320 when the VTEST2_EN signal input to the /CHG_EN terminal is at L level.

A CPU 604 includes a VTEST2_EN_OUT terminal. The CPU 604 outputs the VTEST2_EN signal from the VTEST2_EN_OUT terminal. The VTEST2_EN signal is input to the /CHG_EN terminal of the battery charging IC 602 and the AND gate 371 of the power source control unit 603. The VTEST2_EN signal is used to control the second load test.

When the power supply apparatus 401 is compliant with the USB BC standard, for example, and the second load test is executed, the CPU 604 outputs an H-level VTEST2_EN signal.

However, when the power supply apparatus 401 is not compliant with the USB BC standard, for example, the CPU 604 outputs an L-level VTEST2_EN signal so that the second load test is not executed. Additionally, for example, when the power supply apparatus 401 has been determined to be a personal computer through the enumeration process, the CPU 604 outputs the L-level VTEST2_EN signal so that the second load test is not executed.

The configuration is not limited to that described above, however, and the following may be carried out instead. For example, when the power supply apparatus 401 is based on USB Type-C, for example, the H-level VTEST2_EN signal may be output. On the other hand, when the power supply apparatus 401 is not based on USB Type-C, for example, the L-level VTEST2_EN signal may be output.

The type determination may be executed by the battery charging IC 602, or may be executed by the CPU 604. When the type determination is executed by the battery charging IC 602, the CPU 604 may acquire the result of the type determination from the battery charging IC 602 through communication using the bus line.

Next, an example of operations of the electronic device 601 according to the second embodiment will be described with reference to FIGS. 5A, 5B, 5C, and 5D. FIGS. 5A, 5B, 5C, and 5D are flowcharts illustrating an example of a method by which the electronic device 601 detects the actual power supply capability of the power supply apparatus 401, according to the second embodiment. In the example illustrated in FIGS. 5A, 5B, 5C, and 5D, the first load test is carried out in a state where the battery charging IC 602, which consumes VBUS current, is set to a suspended state. Furthermore, in the example illustrated in FIGS. 5A, 5B, 5C, and 5D, the second load test is carried out in a state where the charging of the battery 320 by the battery charging IC 602 is not carried out by the battery charging IC 602. Processes illustrated in FIGS. 5A, 5B, 5C, and 5D are carried out primarily by the power source control unit 603. Processes carried out by the CPU 604 are indicated by broken lines in FIGS. 5A, 5B, 5C, and 5D.

Step S201 is the same as step S201 in the first embodiment, described with reference to FIG. 2A, and thus descriptions of the process carried out in step S201 will be omitted. After step S201 has been executed, step S203 is executed without step S202 (see FIG. 2A) being executed.

Step S203 to step S212 are the same as step S203 to step S212 in the first embodiment, described with reference to FIG. 2A, and thus descriptions of the processes carried out from step S203 to step S212 will be omitted. After step S208 is executed, step S241 is executed without executing step S223 to step S229 (see FIG. 2B).

Step S241 to step S247 are the same as step S241 to step S247 in the first embodiment, described with reference to FIG. 2C, and thus descriptions of the processes carried out from step S241 to step S247 will be omitted. After step S247 is executed, step S501 is executed.

In step S501, the CPU 604 makes the following determination on the basis of the result of the type determination carried out by the power supply apparatus 401 in step S246 and the result of the enumeration process carried out in step S247. On the basis of these results, the CPU 604 determines whether or not the power supply apparatus 401 connected to the electronic device 601 is an apparatus suitable for the electronic device 601. In the second embodiment, if the power supply apparatus 401 is compliant with the USB BC or USB Type-C standard, for example, the power supply apparatus 401 is determined to be an apparatus suitable for the electronic device 601. If the power supply apparatus 401 is an apparatus suitable for the electronic device 601 (YES in step S501), step S502 is executed. However, if the power supply apparatus 401 is not an apparatus suitable for the electronic device 601 (NO in step S501), step S248 is executed.

In step S502, the CPU 604 outputs the H-level VTEST2_EN signal. Upon the H-level VTEST2_EN signal being supplied from the CPU 604, the battery charging IC 602 disables a function of charging the battery 320. Step S503 is then executed.

In step S503, the CPU 604 keeps the VTEST2_EN signal at H level. Step S224 is then executed.

In step S224, the power source control unit 603 outputs the H-level LD_FET_OS signal from the one-shot timer 357 for the predetermined time TosA. The second load test is started as a result. As described above, in the second embodiment, the load test current LOAD_CURR is set as follows in the second load test. In the second embodiment, the settings are made so that the magnitude of the load test current LOAD_CURR is 1 A, for example, and the time for which the load test current LOAD_CURR flows is 2 ms, for example. Furthermore, in the second embodiment, a VBUS current of 0.5 A, for example, is consumed, separate from the load test current LOAD_CURR, during the second load test. For example, a VBUS current of 0.5 A is consumed by the battery charging IC 602, the CPU 604, and so on. Thus like the first embodiment, a load test using a load current of 1.5 A can be carried out as the second load test in the second embodiment as well. After step S224 is executed, step S225 is executed.

Step S225 to step S228 are the same as step S225 to step S228 in the first embodiment, described with reference to FIG. 2A, and thus descriptions of the processes carried out from step S225 to step S228 will be omitted. After step S228 is executed, step S248 is executed. Step S248 to step S251 are the same as step S248 to step S251 in the first embodiment, described with reference to FIG. 2C, and thus descriptions of the processes carried out from step S248 to step S251 will be omitted. After step S250 is executed, step S504 is executed.

In step S504, the CPU 604 outputs the L-level VTEST2_EN signal. Upon the L-level VTEST2_EN signal being supplied from the CPU 604, the battery charging IC 602 enables the function of charging the battery 320. Step S252 is then executed.

Step S252 is the same as step S252 in the first embodiment, described with reference to FIG. 2C, and thus descriptions of the process carried out in step S252 will be omitted.

Next, an example of operations of the electronic device 601 according to the second embodiment will be described with reference to FIGS. 6A to 6C.

Figure 6A:
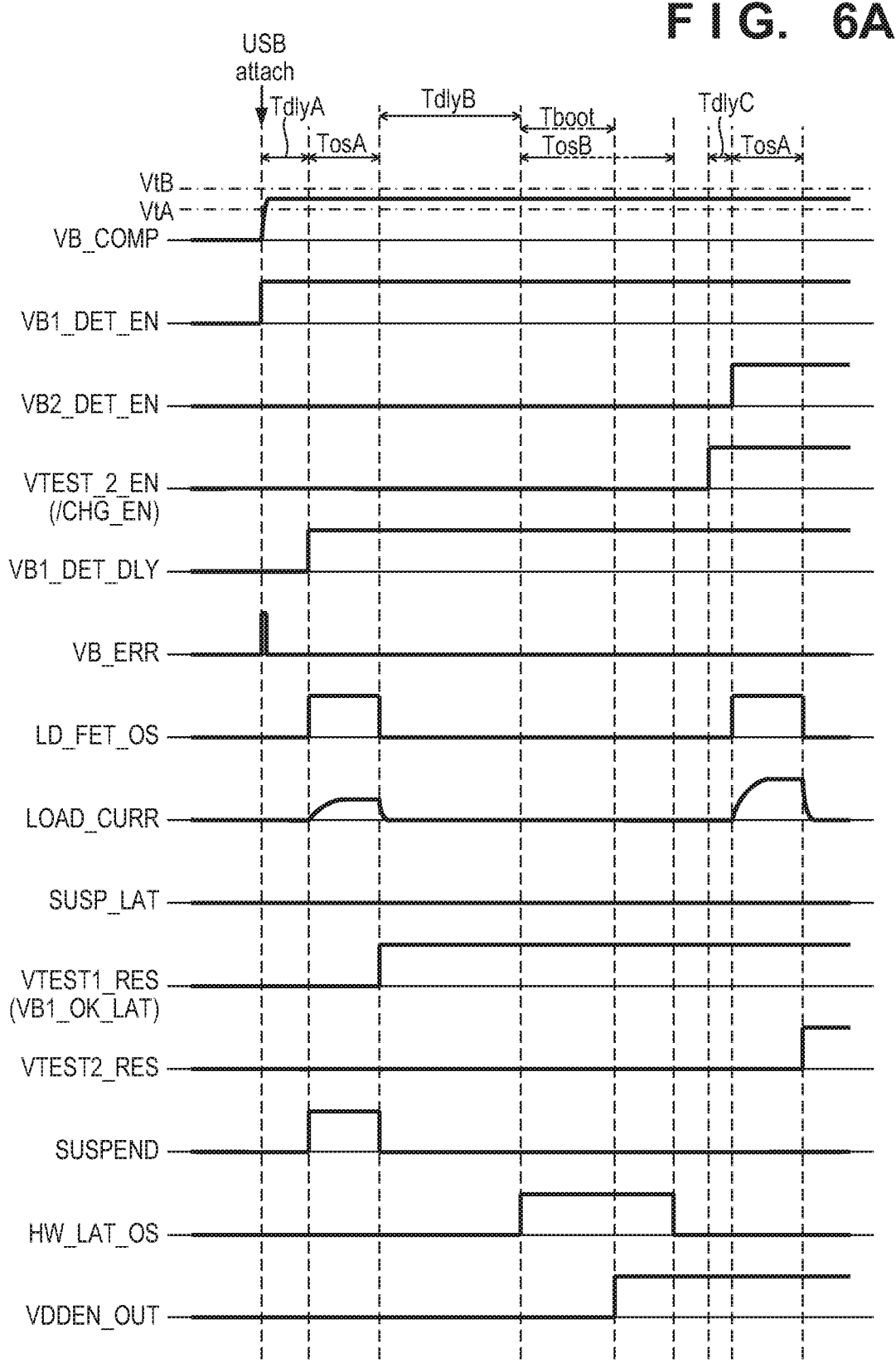
FIG. 6A is a timing chart illustrating an example of operations of the electronic device 601 according to the second embodiment.

FIG. 6A is a timing chart illustrating an example of operations of the electronic device 601 when both the first load test and the second load test succeed.

When, at the timing "USB attach", the VBUS voltage is supplied to the USB connector 390, the VB1_DET_EN signal transitions from L level to H level. The voltage of the VB_COMP signal stabilizes after a delay equivalent to the on time of the P-channel MOSFET 334.

When the voltage of the VB_COMP signal is lower than the reference voltage VtA, the VB_CP_OUTA signal goes to H level and the VB_ERR signal goes to H level, but the SUSPEND signal is at L level until the predetermined time TdlyA has elapsed. In other words, the SUSPEND signal is masked from the timing "USB attach" to when the predetermined time TdlyA has elapsed.

After the predetermined time TdlyA has elapsed following the timing "USB attach", the VB1_DET_DLY signal transitions from L level to H level. The LD_FET_OS signal is at H level during the predetermined time TosA. The SUSPEND signal is at H level while the LD_FET_OS signal is at H level.

After the LD_FET_OS signal transitions from L level to H level, the gate voltage of the N-channel MOSFET 337 rises gradually, and the load test current LOAD_CURR also rises gradually. Here, the VB1_DET_EN signal is at H level and the VB2_DET_EN signal is at L level, and thus the P-channel MOSFET 334 is on and the P-channel MOSFET 384 is off. Accordingly, the load test current LOAD_CURR is set to 0.5 A, for example.

After the predetermined time TosA has elapsed, the LD_FET_OS signal transitions from H level to L level, and the SUSPEND signal transitions from H level to L level.

After the LD_FET_OS signal transitions from H level to L level, the gate voltage of the N-channel MOSFET 337 drops quickly, and the load test current LOAD_CURR also drops quickly. After the LD_FET_OS signal transitions from H level to L level, the VTEST1_RES signal, i.e., the VB1_OK_LAT signal, is latched at H level.

After the predetermined time TdlyB has elapsed following the transition of the VTEST1_RES signal, i.e., the VB1_OK_LAT signal, from L level to H level, the HW_LAT_OS signal transitions from L level to H level. The HW_LAT_OS signal is at H level during the predetermined time TosB. The CPU 304 activates its hardware and software during the predetermined time TosB, when the H-level HW_LAT_OS signal is being output. The activation of the hardware and the software require a time Tboot. After the activation of the hardware and the software is complete, the CPU 304 outputs the H-level VDDEN_OUT signal from the VDDEN_OUT terminal. After the predetermined time TosB has elapsed, the HW_LAT_OS signal transitions from H level to L level.

Having completed the activation of the hardware and the software, the CPU 304 outputs the H-level VTEST2_EN signal. The VTEST2_EN signal is used to control the second load test.

After the predetermined time TdlyC has elapsed following the transition of the VTEST2_EN signal from L level to H level, the VB2_DET_EN signal transitions from L level to H level. The LD_FET_OS signal is at H level during the predetermined time TosA. The SUSPEND signal is kept at L level while the LD_FET_OS signal is at H level, too. Because the VTEST2_EN signal is at H level, the battery charging IC 602 does not charge the battery 320.

After the LD_FET_OS signal transitions from L level to H level, the gate voltage of the N-channel MOSFET 337 rises gradually, and the load test current LOAD_CURR also rises gradually. Here, the VB1_DET_EN signal is at H level and the VB2_DET_EN signal is at H level, and thus the P-channel MOSFET 334 is on and the P-channel MOSFET 384 is on. Accordingly, the load test current LOAD_CURR is set to 1 A, for example. When the VTEST2_EN signal is at H level, a VBUS current of 0.5 A, for example, is consumed, separate from the load test current LOAD_CURR. For example, a VBUS current of 0.5 A is consumed by the battery charging IC 602, the CPU 604, and so on. In the second embodiment, a VBUS current of 0.5 A, for example, is consumed, separate from the load test current LOAD_CURR, during the second load test. For example, a VBUS current of 0.5 A is consumed by the battery charging IC 602, the CPU 604, and so on. Thus as in the first embodiment, a load test using a load current of 1.5 A can be carried out as the second load test in the second embodiment as well.

After the predetermined time TosA has elapsed, the LD_FET_OS signal transitions from H level to L level. After the LD_FET_OS signal transitions from H level to L level, the gate voltage of the N-channel MOSFET 337 drops quickly, and the load test current LOAD_CURR also drops quickly. After the LD_FET_OS signal transitions from H level to L level, the VTEST2_RES signal is latched at H level.

Figure 6B:
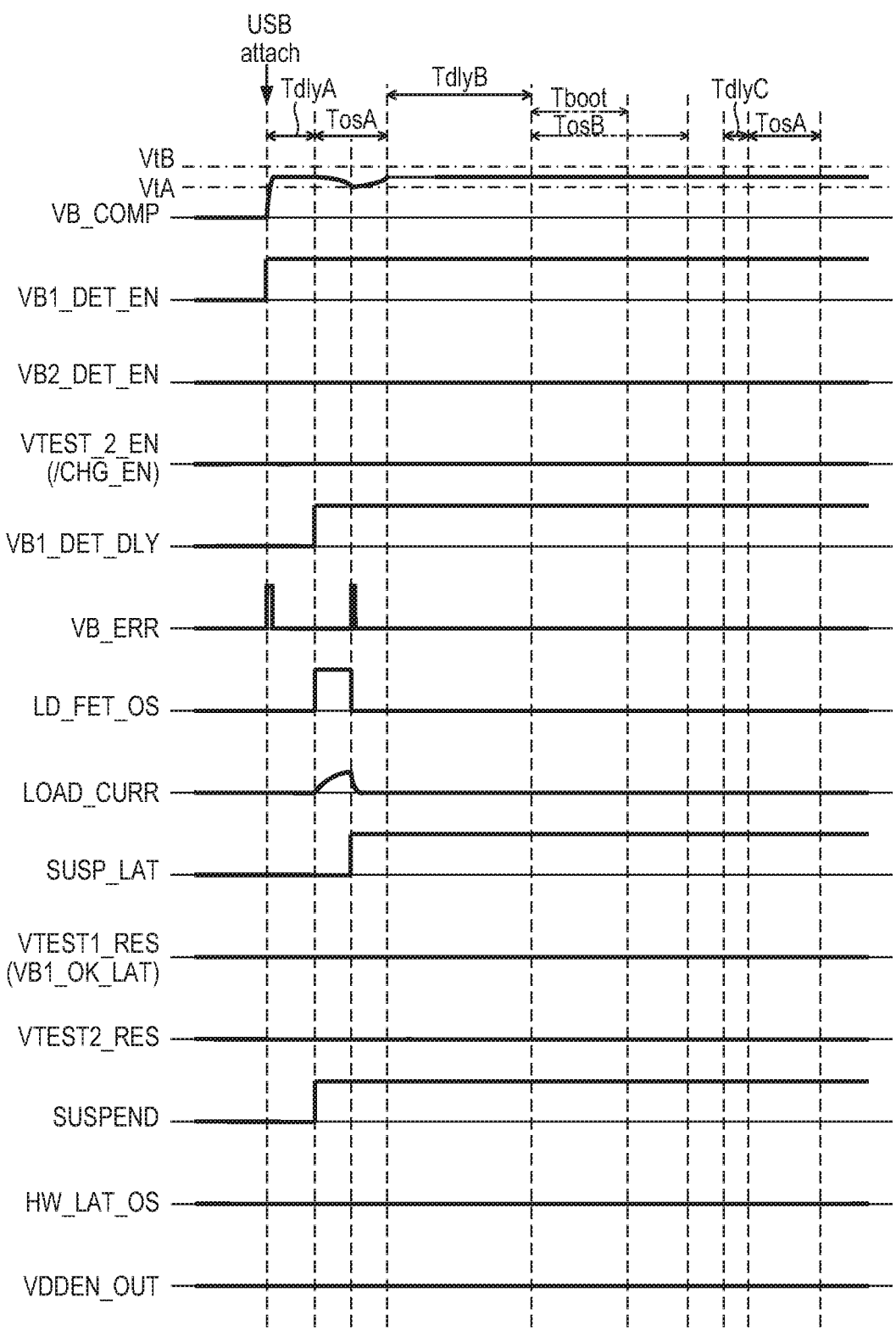
FIG. 6B is a timing chart illustrating an example of operations of the electronic device 601 according to the second embodiment.

FIG. 6B is a timing chart illustrating an example of operations of the electronic device 601 when the first load test does not succeed.

When, at the timing "USB attach", the VBUS voltage is supplied to the USB connector 390, the VB1_DET_EN signal transitions from L level to H level. The voltage of the VB_COMP signal stabilizes after a delay equivalent to the on time of the P-channel MOSFET 334.

When the voltage of the VB_COMP signal is lower than the reference voltage VtA, the VB_CP_OUTA signal goes to H level and the VB_ERR signal goes to H level, but the SUSPEND signal is at L level until the predetermined time TdlyA has elapsed. In other words, the SUSPEND signal is masked from the timing "USB attach" to when the predetermined time TdlyA has elapsed.

After the predetermined time TdlyA has elapsed following the timing "USB attach", the VB1_DET_DLY signal transitions from L level to H level. The LD_FET_OS signal then goes to H level. The SUSPEND signal is at H level while the LD_FET_OS signal is at H level.

After the LD_FET_OS signal transitions from L level to H level, the gate voltage of the N-channel MOSFET 337 rises gradually, and the load test current LOAD_CURR also rises gradually. Here, the VB1_DET_EN signal is at H level and the VB2_DET_EN signal is at L level, and thus the P-channel MOSFET 334 is on and the P-channel MOSFET 384 is off. Accordingly, the load test current LOAD_CURR is set to 0.5 A, for example.

Before the predetermined time TosA elapses, the VBUS voltage drops, the voltage of the VB_COMP signal falls below the reference voltage VtA, and the VB_CP_OUTA signal output from the comparator 343 goes to H level. Then, the VB_ERR signal output from the OR gate 349 transitions from L level to H level, and the SUSP_LAT signal output from the Q1 terminal of the D flip-flop 362 is latched at H level. The LD_FET_OS signal then transitions from H level to L level, and the SUSPEND signal is kept at H level. After the LD_FET_OS signal transitions from H level to L level, the gate voltage of the N-channel MOSFET 337 drops quickly, and the load test current LOAD_CURR also drops quickly.

The HW_LAT_OS signal is kept at L level, and the CPU 304 does not activate its hardware and software. The VTEST1_RES signal, i.e., the VB1_OK_LAT signal, is kept at L level, and the VTEST2_RES signal is also kept at L level.

FIG. 6C is a timing chart illustrating an example of operations of the electronic device 601 when the first load test succeeds but the second load test does not succeed.

When, at the timing "USB attach", the VBUS voltage is supplied to the USB connector 390, the VB1_DET_EN signal transitions from L level to H level. The voltage of the VB_COMP signal stabilizes after a delay equivalent to the on time of the P-channel MOSFET 334.

When the voltage of the VB_COMP signal is lower than the reference voltage VtA, the VB_CP_OUTA signal goes to H level and the VB_ERR signal goes to H level, but the SUSPEND signal is at L level until the predetermined time TdlyA has elapsed. In other words, the SUSPEND signal is masked from the timing "USB attach" to when the predetermined time TdlyA has elapsed.

After the predetermined time TdlyA has elapsed following the timing "USB attach", the VB1_DET_DLY signal transitions from L level to H level. The LD_FET_OS signal is at H level during the predetermined time TosA. The SUSPEND signal is at H level while the LD_FET_OS signal is at H level.

After the LD_FET_OS signal transitions from L level to H level, the gate voltage of the N-channel MOSFET 337 rises gradually, and the load test current LOAD_CURR also rises gradually. Here, the VB1_DET_EN signal is at H level and the VB2_DET_EN signal is at L level, and thus the P-channel MOSFET 334 is on and the P-channel MOSFET 384 is off. Accordingly, the load test current LOAD_CURR is set to 0.5 A, for example.

After the predetermined time TosA has elapsed, the LD_FET_OS signal transitions from H level to L level, and the SUSPEND signal transitions from H level to L level.

After the LD_FET_OS signal transitions from H level to L level, the gate voltage of the N-channel MOSFET 337 drops quickly, and the load test current LOAD_CURR also drops quickly.

After the LD_FET_OS signal transitions from H level to L level, the VTEST1_RES signal, i.e., the VB1_OK_LAT signal, is latched at H level.

After the predetermined time TdlyB has elapsed following the transition of the VTEST1_RES signal, i.e., the VB1_OK_LAT signal, from L level to H level, the HW_LAT_OS signal transitions from L level to H level. The HW_LAT_OS signal is at H level during the predetermined time TosB.

The CPU 304 activates its hardware and software during the predetermined time TosB, when the H-level HW_LAT_OS signal is being output. The activation of the hardware and the software require a time Tboot. After the activation of the hardware and the software is complete, the CPU 304 outputs the H-level VDDEN_OUT signal from the VDDEN_OUT terminal. After the predetermined time TosB has elapsed, the HW_LAT_OS signal transitions from H level to L level.

Having completed the activation of the hardware and the software, the CPU 304 outputs the H-level VTEST2_EN signal. The VTEST2_EN signal is used to control the second load test.

Upon the VTEST2_EN signal transitioning from L level to H level, the VB2_DET_EN signal also transitions from L level to H level. Then, after the predetermined time TdlyC has elapsed following the transition of the VTEST2_EN signal from L level to H level, the LD_FET_OS signal goes to H level. The SUSPEND signal is kept at L level while the LD_FET_OS signal is at H level. Because the VTEST2_EN signal is at H level, the battery charging IC 602 does not charge the battery 320.

After the LD_FET_OS signal transitions from L level to H level, the gate voltage of the N-channel MOSFET 337 rises gradually, and the load test current LOAD_CURR also rises gradually. Here, the VB1_DET_EN signal is at H level and the VB2_DET_EN signal is at H level, and thus the P-channel MOSFET 334 is on and the P-channel MOSFET 384 is on. Accordingly, the load test current LOAD_CURR is set to 1 A. When the VTEST2_EN signal is at H level, a VBUS current of 0.5 A, for example, is consumed, separate from the load test current LOAD_CURR. For example, a VBUS current of 0.5 A is consumed by the battery charging IC 602, the CPU 604, and so on. In the second embodiment, a VBUS current of 0.5 A, for example, is consumed, separate from the load test current LOAD_CURR, during the second load test. For example, a VBUS current of 0.5 A is consumed by the battery charging IC 602, the CPU 604, and so on. Thus like the first embodiment, a load test using a load current of 1.5 A can be carried out as the second load test in the second embodiment as well.

Before the predetermined time TosA elapses, the VBUS voltage drops, the voltage of the VB_COMP signal falls below the reference voltage VtA, and the VB_CP_OUTA signal output from the comparator 343 goes to H level. Then, the VB_ERR signal output from the OR gate 349 transitions from L level to H level, and the SUSP_LAT signal output from the Q1 terminal of the D flip-flop 362 is latched at H level. Then, the LD_FET_OS signal and the SUSPEND signal go to L level, and the VTEST2_RES signal is latched at L level.

After the LD_FET_OS signal transitions from H level to L level, the gate voltage of the N-channel MOSFET 337 drops quickly, and the load test current LOAD_CURR also drops quickly.

In this manner, according to the second embodiment, a test for detecting the actual power supply capability of the power supply apparatus 401 can be carried out in a state where the battery charging IC 302 has limited the power received from the power supply apparatus 401. Furthermore, according to the second embodiment, the actual power supply capability of the power supply apparatus 401 can be detected by carrying out such a test.

Additionally, according to the second embodiment, multiple load tests having different load current magnitudes can be carried out. As such, the actual power supply capability of the power supply apparatus 401 can be detected even if the VBUS current is defined as a broad range, i.e. from 0.5 to 1.5 A, as is the case with USB BC, for example.

Furthermore, according to the second embodiment, the second load test can be carried out in a state where the battery charging IC 602 is set to not charge the battery 320. Thus according to the second embodiment, the actual power supply capability of the power supply apparatus 401 can be detected by carrying out the second load test in this manner, without being affected by the charging state of the battery 320.

Note that embodiments of the disclosure are not limited to the second embodiment described above. Changes or revisions made to the second embodiment within a scope of the disclosure are included in embodiments of the disclosure.

For example, although the second embodiment describes a case where information is transmitted between the battery charging IC 602 and the power source control unit 603 using a plurality of signal lines as an example, the configuration is not limited thereto. For example, the information may be transmitted between the battery charging IC 302 and the power source control unit 303 through serial transfer. In this case, a two-line type, three-line type, or other serial communication standard can be used, for example.

Furthermore, although the second embodiment describes a case where the battery charging IC 602 and the power source control unit 603 are provided as independent entities as an example, the configuration is not limited thereto. For example, the battery charging IC 602 and the power source control unit 603 may be configured as an integrated entity.

Third Embodiment

Next, an electronic device 701 according to a third embodiment will be described with reference to FIGS. 7A and 7B. Of components included in the electronic device 701 according to the third embodiment, components that are the same as the components of the electronic device 301 according to the first embodiment will be given the same reference signs, and descriptions thereof will be omitted or simplified. Likewise, of components included in the electronic device 701 according to the third embodiment, components that are the same as the components included in the electronic device 601 according to the second embodiment will be given the same reference signs, and descriptions thereof will be omitted or simplified.

With the electronic device 701 according to the third embodiment, part of a power source control unit 703 is constituted by a CPU 704, which is provided separate from the CPU 604.

Figure 7A:
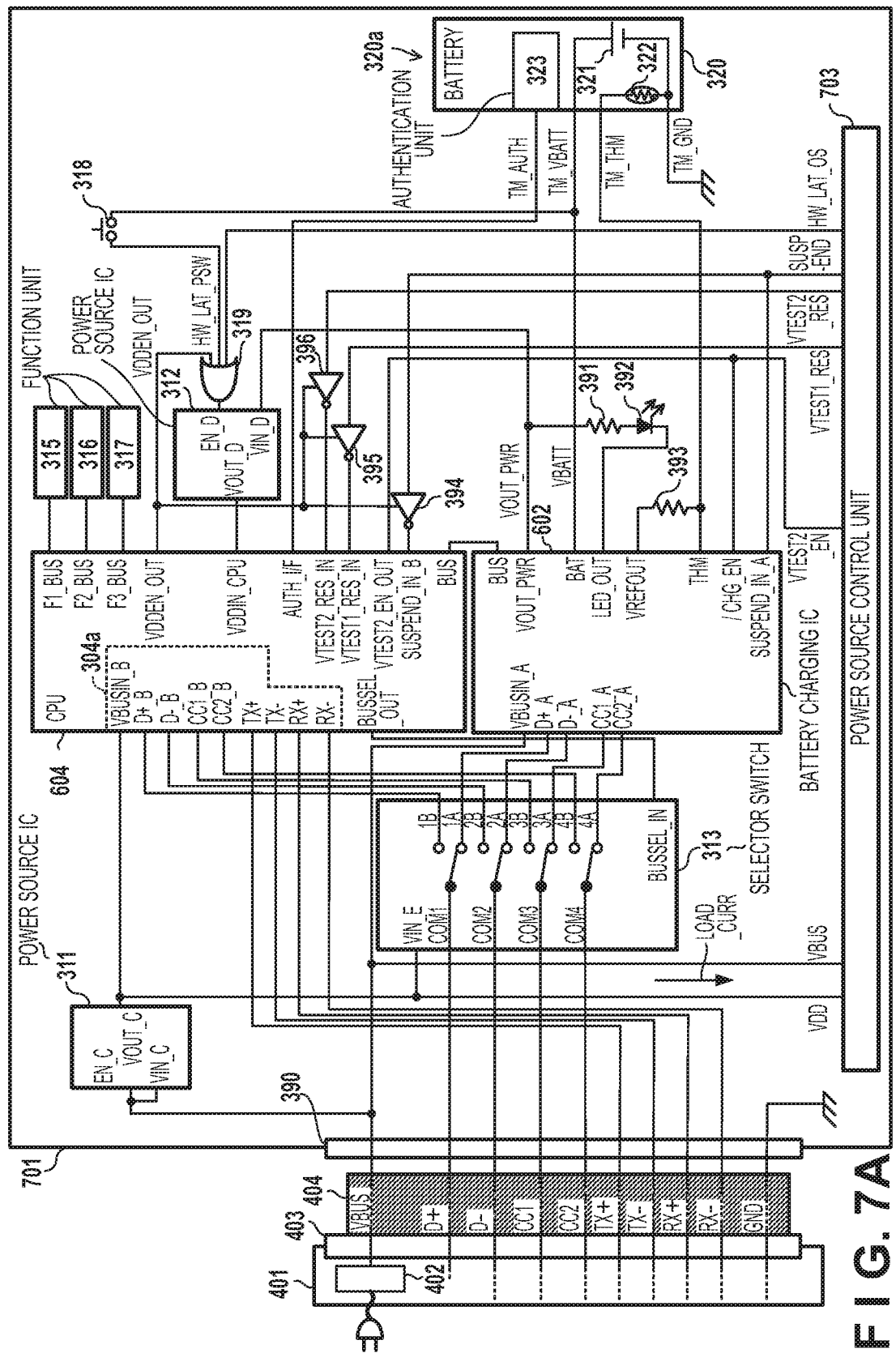
FIGS. 7A and 7B are block diagrams illustrating one example of components of an electronic device 701 according to a third embodiment.
Figure 7B:
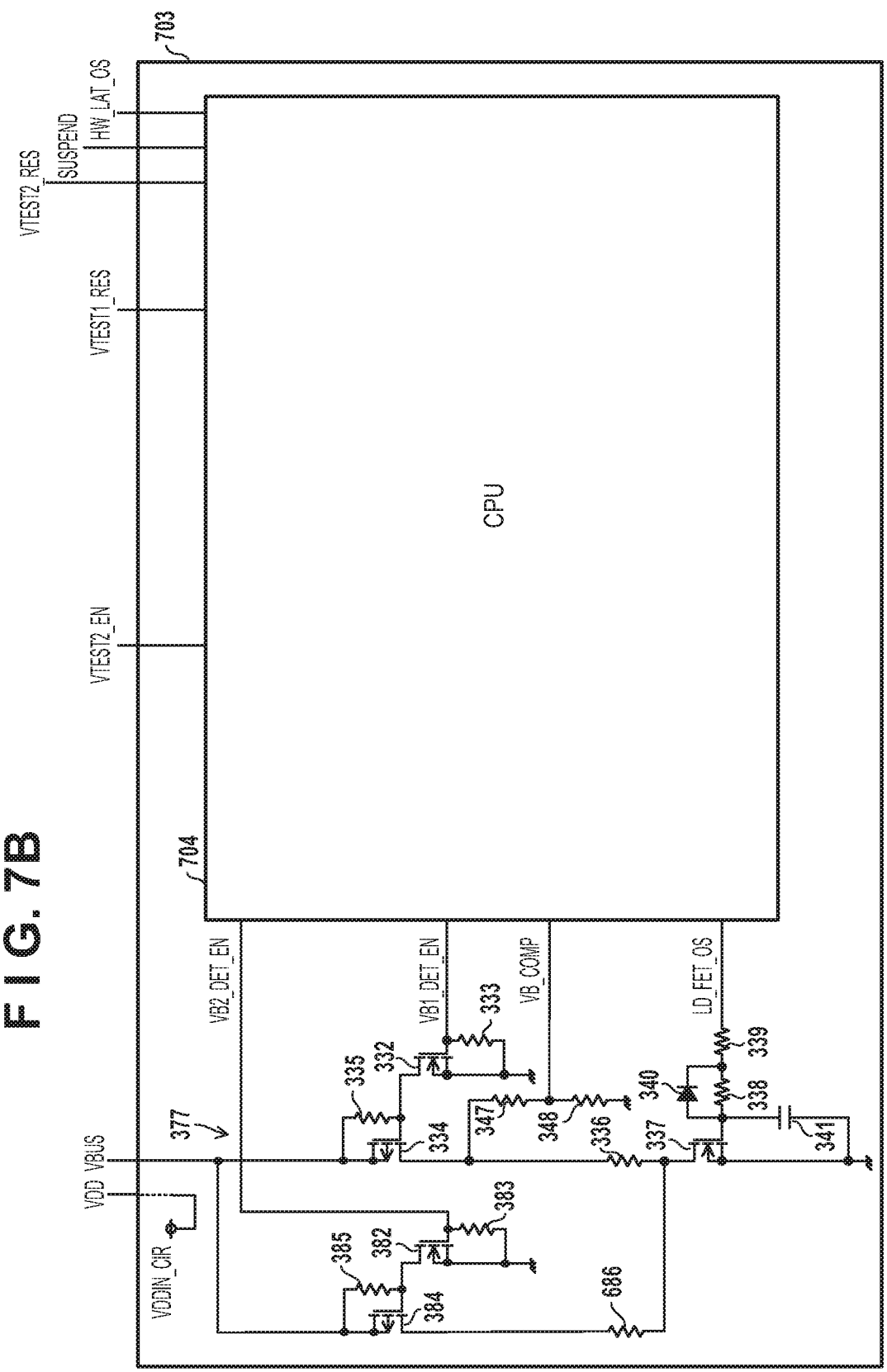

FIGS. 7A and 7B are block diagrams illustrating one example of components of the electronic device 701 according to the third embodiment. As illustrated in FIGS. 7A and 7B, the power source control unit 703 includes the CPU 704. The CPU 704 implements some of the same functions as the power source control unit 603 according to the second embodiment.

Upon transitioning from a state where the power source voltage is not being supplied to the power source control unit 703 to a state where the power source voltage is supplied to the power source control unit 703, the power source control unit 703 behaves as follows. The logic of the circuits in the power source control unit 703 is reset to a default state, and the functions of the circuits in the power source control unit 703 are negated. On the other hand, upon transitioning from a state where the power source voltage is being supplied to the power source control unit 703 to a state where the power source voltage is not supplied to the power source control unit 703, the functions of the circuits of the power source control unit 703 are negated.

The power source control unit 703 can operate in the same manner as the power source control unit 603 according to the second embodiment, and thus the electronic device 701 can execute the same operations as those in the example of operations described with reference to FIGS. 5A, 5B, 5C, and 5D.

Furthermore, the power source control unit 703 may be configured to be capable of operating in the same manner as the power source control unit 303 according to the first embodiment. In this case, the /CHG_EN terminal of the battery charging IC 602 is replaced with the CHG_TYPE_OUT terminal (see FIG. 1A). In this case, the CPU 604 is not provided with the VTEST2_EN_OUT terminal. Furthermore, in this case, the resistor 686 is replaced with the resistor 386. Further still, in this case, the electronic device 701 can execute the same operations as those in the example of operations described with reference to FIGS. 2A, 2B, and 2C.

In this manner, according to the third embodiment, part of the power source control unit 703 is constituted by the CPU 704, which is provided separate from the CPU 604. Furthermore, like the first embodiment and the second embodiment, the actual power supply capability of the power supply apparatus 401 can be determined in the third embodiment as well.

Note that embodiments of the disclosure are not limited to the third embodiment described above. Changes or revisions made to the third embodiment within a scope of the disclosure are included in embodiments of the disclosure.

Fourth Embodiment

Various kinds of functions, processes, or methods described in the first to third embodiments can also be achieved by a personal computer, a microcomputer, a CPU (central processing unit), or the like using a program. In a fourth embodiment, a personal computer, a microcomputer, a CPU, or the like will be called a "computer X" below. Also, in the fourth embodiment, a program for controlling the computer X and achieving various kinds of functions, processes, or methods described in the first to third embodiments will be called a "program Y".

Various kinds of functions, processes, or methods described in the first to third embodiments are achieved by the computer X executing the program Y. In this case, the program Y is supplied to the computer X via a computer-readable storage medium. The computer-readable storage medium according to the fourth embodiment includes at least one of a hard disk device, a magnetic storage device, an optical storage device, a magneto-optical storage device, a memory card, a volatile memory (e.g., random access memory), a non-volatile memory (e.g., read only memory), or the like. The computer-readable storage medium according to the fourth embodiment is a non-transitory storage medium.

Note that embodiments of the disclosure are not limited to the fourth embodiment described above. Changes or revisions made to the fourth embodiment within a scope of the disclosure are included in embodiments of the disclosure.

While aspects of the disclosure are described with reference to exemplary embodiments, it is to be understood that the aspects of the disclosure are not limited to the exemplary embodiments. The scope of the following claims is to be accorded the broadest interpretation so as to encompass all modifications and equivalent structures.

This application claims priority from Japanese Patent Application No. 2018-015240, filed on Jan. 31, 2018, which is hereby incorporated by reference herein in its entirety.

What is claimed is:

1. An electronic device comprising:
a connector that receives power supplied from a power supply apparatus;
a charging unit that charges a battery;
a control unit that enables the charging unit to charge the battery; and
a testing unit that (i) carries out a first load test in which first current is supplied to a load unit of the electronic device from the power supply apparatus in a state where the charging unit stops charging the battery, (ii) avoids activating the control unit in a case where the first load test has not succeeded, (iii) carries out a second load test in which second current higher than the first current is supplied to the load unit from the power supply apparatus in a case where the first load test has succeeded, and (iv) activates the control unit to enable the charging unit in a case where the second load test has succeeded, wherein the control unit enables the charging unit to charge the battery with power received from the power supply apparatus after the second load test has succeeded and the control unit is activated.

2. The electronic device according to claim 1, wherein the connector includes a first terminal for receiving power from the power supply apparatus, and wherein the testing unit determines that the first load test or the second load test has not succeeded, in the case where a voltage of the first terminal has become less than a threshold voltage.

3. The electronic device according to claim 1, wherein the first current corresponds to 0.5 A, and the second current corresponds to 1.5 A.

4. The electronic device according to claim 1, wherein the first load test is carried out in a state where the charging unit has been set to a suspended state.

5. The electronic device according to claim 1, wherein the second load test is carried out in a state where the charging unit has been set to a suspended state.

6. The electronic device according to claim 1, wherein the second load test is carried out in a state where the charging unit has been set to not charge the battery with power received from the power supply apparatus.

7. The electronic device according to claim 1, wherein the connector is compliant with USB Type-C.

8. A method comprising:

causing a testing unit of an electronic device to carry out a first load test in which a first current is supplied to a load unit of the electronic device from a power supply apparatus in a state where a charging unit of the electronic device stops charging a battery;

causing the testing unit to avoid activating a control unit of the electronic device in a case where the first load test has not succeeded;

causing the testing unit to carry out a second load test in which a second current higher than the first current is supplied to the load unit from the power supply apparatus in a case where the first load test has succeeded;

causing the testing unit to activate the control unit in a case where the second load test has succeeded; and causing the control unit to enable the charging unit to charge the battery with power received from the power supply apparatus after the second load test has succeeded and the control unit is activated.

9. A non-transitory storage medium that stores a program causing a computer to execute a method, the method comprising:

causing a testing unit of an electronic device to carry out a first load test in which a first current is supplied to a load unit of the electronic device from a power supply apparatus in a state where a charging unit of the electronic device stops charging a battery;

causing the testing unit to avoid activating a control unit of the electronic device in a case where the first load test has not succeeded;

causing the testing unit to carry out a second load test in which a second current higher than the first current is supplied to the load unit from the power supply apparatus in a case where the first load test has succeeded;

causing the testing unit to activate the control unit in a case where the second load test has succeeded; and causing the control unit to enable the charging unit to charge the battery with power received from the power supply apparatus after the second load test has succeeded and the control unit is activated.

* * * * *